United States Patent
Meyer et al.

(10) Patent No.: US 12,534,568 B2
(45) Date of Patent: Jan. 27, 2026

(54) POLYESTER CARBONATES CONSISTING OF DIFFERENT DIOLS IN A DEFINED RATIO

(71) Applicant: Covestro Deutschland AG, Leverkusen (DE)

(72) Inventors: Alexander Meyer, Düsseldorf (DE); Thomas Pfingst, Tönisvorst (DE); Lukas Fabian Schulz, Lemgo (DE)

(73) Assignee: Covestro Deutschland AG, Leverkusen (DE)

( * ) Notice: Subject to any disclaimer, the term of this patent is extended or adjusted under 35 U.S.C. 154(b) by 638 days.

(21) Appl. No.: 17/918,782

(22) PCT Filed: Jun. 11, 2021

(86) PCT No.: PCT/EP2021/065745
§ 371 (c)(1),
(2) Date: Oct. 13, 2022

(87) PCT Pub. No.: WO2021/254894
PCT Pub. Date: Dec. 23, 2021

(65) Prior Publication Data
US 2023/0145772 A1 May 11, 2023

(30) Foreign Application Priority Data

Jun. 19, 2020 (EP) .................................. 20181051
Jun. 19, 2020 (EP) .................................. 20181052
Jun. 19, 2020 (EP) .................................. 20181053

(51) Int. Cl.
*C08G 63/64* (2006.01)
*C08G 63/199* (2006.01)
*C08G 63/672* (2006.01)

(52) U.S. Cl.
CPC ......... *C08G 63/672* (2013.01); *C08G 63/199* (2013.01); *C08G 63/64* (2013.01)

(58) Field of Classification Search
None
See application file for complete search history.

(56) References Cited

U.S. PATENT DOCUMENTS

| 3,972,852 A | 8/1976 | Inata et al. |
| 2004/0092703 A1 | 5/2004 | Germroth et al. |
| 2009/0105393 A1 | 4/2009 | Jansen et al. |
| 2016/0152767 A1* | 6/2016 | Oh .................. C08G 63/66 528/298 |
| 2021/0301081 A1* | 9/2021 | Oh .................. C08G 64/30 |

FOREIGN PATENT DOCUMENTS

| DE | 2438053 A1 | 2/1975 |
| EP | 3026074 A1 | 6/2016 |
| EP | 3248999 A1 | 11/2017 |
| EP | 3708601 A1 | 9/2020 |
| JP | 4345616 A | 12/1992 |
| JP | 201077398 A | 4/2010 |
| WO | 0132742 A1 | 5/2001 |
| WO | 2019093770 A1 | 5/2019 |
| WO | 2019147051 A1 | 8/2019 |
| WO | 2020085686 A1 | 4/2020 |
| WO | 20200126806 A1 | 6/2020 |

* cited by examiner

*Primary Examiner* — David J Buttner
(74) *Attorney, Agent, or Firm* — The Webb Law Firm

(57) ABSTRACT

The present invention relates to a process for preparing a polyester carbonate on the basis of cycloaliphatic diacids and at least one 1,4:3,6-dianhydrohexitol and at least one further aliphatic dihydroxy compound, to a polyester carbonate and to a molding compound and a molded product containing the polyester carbonate. The polyester carbonates according to the invention are characterized by good mechanical properties and molecular weights.

8 Claims, No Drawings

POLYESTER CARBONATES CONSISTING OF DIFFERENT DIOLS IN A DEFINED RATIO

CROSS-REFERENCE TO RELATED APPLICATIONS

This application is the United States national phase of International Application No. PCT/EP2021/065745 filed Jun. 11, 2021, and claims priority to European Patent Application Nos. 20181051.2 filed Jun. 19, 2020, 20181052.0 filed Jun. 19, 2020, and 20181053.8 filed Jun. 19, 2020, the disclosures of which are hereby incorporated by reference in their entirety.

BACKGROUND OF THE INVENTION

Field of the Invention

The present invention relates to copolyestercarbonates of structural formula (1) having a defined ratio of different structural units resulting from diols, to a molding compound, to a molded article and to a process for preparing the corresponding polyestercarbonates.

Description of Related Art

Polyesters, polycarbonates and polyestercarbonates are known to have good properties in terms of mechanical properties, heat distortion stability and weathering resistance. Depending on the monomers used, each polymer group has certain key features that characterize such materials. For instance, polycarbonates in particular have good mechanical properties, while polyesters often display better chemical stability. Depending on the monomers selected, polyestercarbonates display property profiles from both of the mentioned groups.

Although aromatic polycarbonates or polyesters frequently exhibit a good profile of properties, they do display shortcomings with respect to ageing and weathering resistance. For example, absorption of UV light leads to yellowing and in some cases embrittlement of these thermoplastic materials. In this respect, aliphatic polycarbonates and polyestercarbonates have better properties, in particular better ageing and/or weathering resistances as well as better optical properties (for example transmittance).

The disadvantage with aliphatic polycarbonates or polyestercarbonates is often their low glass transition temperature. It is accordingly advantageous to use cycloaliphatic alcohols as (co)monomers. Examples of such cycloaliphatic alcohols include TCD alcohol (tricyclodecanedimethanol; 8-(hydroxymethyl)-3-tricyclo [5.2.1.02,6]decanyl]methanol), cyclohexanediol, cyclohexanedimethanol and biobased diols based on 1,4:3,6-dianhydrohexitols such as isosorbide and the isomers isomannide and isoidide. To raise the glass transition temperature further, cycloaliphatic acids such as 1,2-, 1,3- or 1,4-cyclohexanedicarboxylic acids or corresponding naphthalene derivatives may also be used as (co)monomers. Depending on the choice of reactants, polyesters or polyestercarbonates are then obtained. This application relates to copolyestercarbonates based on 1,4:3,6-dianhydrohexitols such as isosorbide and isomers and also cycloaliphatic diacids containing certain amounts of further diols in order to attain improved properties. The invention further relates to a process for preparing these copolyestercarbonates which features the direct reaction of the raw materials and does not require any raw materials that are challenging to handle, such as phosgene.

Polyesters of cyclohexanedicarboxylic acid isosorbide are described by Oh et al. in Macromolecules 2013, 46, 2930-2940. However, the present invention is preferably directed to polyestercarbonates.

Polyesters are prepared industrially, for example, by transesterification of corresponding ester-containing monomers with diols. For instance, the polyester of 1,4-cyclohexanedimethanol and 1,4-cyclohexanedicarboxylic acid is produced starting from the dimethyl ester of the diacid (blend of this polyester and polycarbonate: Xyrex® from DuPont).

For the transesterification reaction, however, phenyl esters are much more reactive than their aliphatic analogs. EP 3026074 A1 and EP 3248999 A1 describe processes for preparing polyestercarbonates with phenyl esters as intermediate step.

Example 1 of EP 3026074 A1 describes the direct reaction of the diacid with phenol to give the corresponding esters. In example 2 of EP 3026074 A1, a dimethyl ester is reacted with phenol. However, there is still room for improvement in terms of the yields for both variants of the phenyl ester preparation. This then followed by preparation of the polyestercarbonate. The polyestercarbonate is prepared from only one diol.

EP 3248999 A1 describes the preparation of a diphenyl ester in a solvent with the use of phosgene. Since the subsequent reaction to give the aliphatic polyestercarbonate does not require phosgene, the combination of a phosgene process with a transesterification process in a single part of a plant is very disadvantageous. The process described in EP 3248999 A1 is therefore not optimal either, and here too only one diol is used to prepare the polymer. In WO2020/085686 A1, polyestercarbonates are prepared from isosorbide, cyclohexanedicarboxylic acid and a further diol, which may for example be cyclohexanedimethanol. However, very high amounts of cyclohexanedimethanol are used here. Excessive amounts of cyclohexanedimethanol frequently negatively impact the thermal properties of the polymer, however. In particular, there is a drastic drop in glass transition temperature.

WO2019/147051 A1 discloses a two-stage process in which an additional acid such as terephthalic acid is used. US 2009/105393 A1 discloses an isosorbide-based polycarbonate comprising: an isosorbide unit; an aliphatic unit which is derived from an aliphatic C14 to C44 diacid, an aliphatic C14 to C44 diol or a combination thereof; and optionally an additional unit which differs from the isosorbide and aliphatic units, the isosorbide unit, the aliphatic unit and the additional unit each being carbonates or a combination of carbonate and ester units. The frequent disadvantages of aliphatic polycarbonates or polyestercarbonates have already been discussed above. In the examples, no polymers are prepared which are derived from a combination of isosorbide, a cycloaliphatic diacid and additionally an aliphatic diol. In addition, an activated carbonate is used for the transesterification.

WO 01/32742 A1, for example, describes the simple preparation of aromatic polyestercarbonates. This document reveals a direct synthesis or one-pot synthesis, that is to say a synthesis in which all of the structural elements that form the subsequent polyestercarbonate are already present as monomers at the start of the synthesis. The monomers used here are aromatic dihydroxy compounds such as, for example, bisphenol A, carboxylic diesters and aromatic or linear aliphatic diacids. As a result of the fact that exclusively aromatic polyestercarbonates are prepared in this document, temperatures of 300° C. may be employed in the condensation reaction with removal of the phenol formed. The use of such temperatures is not possible in the preparation of aliphatic polyestercarbonates since under such temperature stress aliphatic diols undergo elimination and/or tend toward thermal decomposition. However, at the same time the high temperature is necessary in order to build up the desired high molecular weights. The differing reactivity of aliphatic and aromatic diols becomes particularly clear here. It is known for example from the literature that isosorbide is rarely incorporated completely into a polymer, and instead that up to 25% of the isosorbide is lost during the polymerization reaction, depending on the selected reaction conditions. It is therefore not readily possible to carry the reaction conditions for aromatic diols over to aliphatic diols. This is evident in particular from the fact that the reaction times for the polycondensation (corresponding to process step (ii)) in WO01/32742 A1 are markedly longer at elevated temperatures than those observed according to the invention.

Likewise, JP1992-345616 A and DE2438053 A1 employ aromatic units and correspondingly high temperatures. For the abovementioned reasons, it is not possible for the teaching in said documents to be carried over to aliphatic units.

The as-yet unpublished application PCT/EP2019/084847 discloses a one-pot synthesis of a polyestercarbonate, comprising a cycloaliphatic dicarboxylic acid, a diaryl carbonate and an aliphatic dihydroxy compound.

The polyestercarbonates described in EP 3026074 A1 and in EP 3248999 A1 have high glass transition temperatures. However, the structure of these polyestercarbonates is very rigid. This is in particular a consequence of the isosorbide structure incorporated into the polymer chain by condensation. Due to the rigid nature, the bicyclic substructure increases the glass transition temperature but makes the polymer chain highly inflexible; this can in principle lead to disadvantages. Park et al. describe that higher amounts of isosorbide in the polymer lead to a reduction in the molecular weight (S. A. Park et al. *Polymer* 2017, 116, 153-159; pp. 155/156). The authors describe that an increase in the molecular weight is impeded by the high melt viscosity. If a critical molecular weight is not achieved, this may lead to inadequate mechanical properties. This is significant for inflexible polymer chains in particular. Rigid chains require a relatively high molecular weight in order to be able to become entangled. A failure to achieve this results in brittle behavior (critical entanglement molecular weight).

While cyclohexanedicarboxylic acid does increase the flexibility somewhat, the overall structure of the polymer chain still remains quite rigid. This can lead to disadvantages during the preparation of the polymers. The inflexible nature makes it more difficult for the reaction partners (chain ends) to find each other as the molecular weight increases. As described above, this limits the molecular weight. In addition, the rigid nature causes a sharp increase in the viscosity during the polymer synthesis. To compensate for this, during the polymer preparation the temperature is often increased in the end phase of the polycondensation in order to achieve better flowability. However, this is possible only to a limited extent in the case of aliphatic polymers, since the thermal stability is much lower compared, for example, to aromatic polyesters or polycarbonates. The increasing viscosity, which cannot be compensated for by an increase in the temperature, results in deficient mixing and low surface renewal. Condensation products (for example phenol) can therefore no longer be removed and the polycondensation is cut short.

In order to create better surface renewal, WO2019147051 A1 describes the use of horizontal polymer reactors such as polymer kneaders. These exert high shear forces on the polymer; surface renewal is accordingly increased and polycondensation can be continued. However, the high shear forces place an enormous stress on the flexible polymer.

The high shear stress can result in damage, which may manifest in the deterioration of the optical and mechanical properties.

SUMMARY OF THE INVENTION

Proceeding from this prior art, it was therefore an object of the present invention to provide a polyestercarbonate, comprising at least one 1,4:3,6-dianhydrohexitol and at least one specific cycloaliphatic dicarboxylic acid, featuring sufficiently high molecular weights. The term "sufficiently high molecular weights" is preferably understood to mean a polymer which has a relative solution viscosity of more than 1.20, preferably 1.20 to 1.70, more preferably 1.22 to 1.65 and especially preferably from 1.30 to 1.62, measured in each case in dichloromethane at a concentration of 5 g/l at 25° C. with an Ubbelohde viscometer. The polyestercarbonates according to the invention should moreover possess better processing properties and good mechanical properties. These should result in particular from the sufficiently high molar mass. High molecular weights result for example from better surface renewal in the preparation process. A further object was that of providing the simplest possible process for preparing polyestercarbonates by means of melt transesterification. In this case, "simple" is understood in particular to mean a process which is undemanding in terms of apparatus, comprises few stages, in particular purification stages, and/or is thus economically and also environmentally advantageous. In particular, the process according to the invention should not require starting materials that are challenging to handle, especially phosgene.

At least one and preferably all of the objects mentioned above have been achieved by the present invention. It has surprisingly been found that it is possible to synthesize a polyestercarbonate from at least one cycloaliphatic diacid, at least one diaryl carbonate, at least one 1,4:3,6-dianhydrohexitol and at least one further aliphatic dihydroxy compound by means of melt transesterification in a direct synthesis or one-pot synthesis in which all of the structural elements that form the subsequent polyestercarbonate are already present as monomers at the start of the synthesis. However, it has been found that a polymer having an appropriate molar mass and hence also appropriate mechanical properties is obtained only when a specific amount of the at least one further diol HO-x-OH is used. Furthermore, this at least one further diol must preferably have at least one branch. It was firstly surprising that a direct synthesis, despite the preconceptions described in the prior art, also works for the reaction of a cycloaliphatic dicarboxylic acid, a 1,4:3,6-dianhydrohexitol and at least one further aliphatic dihydroxy compound HO-x-OH (also referred to in accordance with the invention as "aliphatic diol") and a diaryl carbonate. It was also entirely surprising that the amount of the at least one further aliphatic dihydroxy compound HO-x-OH is important for obtaining a good molecular weight increase. In this way, it was possible to discover a process making it possible to obtain a polyestercarbonate from cycloaliphatic diacids, a 1,4:3,6-dianhydrohexitol and at least one further aliphatic dihydroxy compound HO-x-OH, this process being particularly simple, that is to say undemanding in terms of apparatus, requiring few stages, in particular purification stages, and hence being economically and also environmentally advantageous.

Moreover, it was found that the incorporation of small amounts of additional aliphatic dihydroxy compounds HO-x-OH, especially the incorporation of branched aliphatic dihydroxy compounds, increases surface renewal during the synthesis. It was particularly surprising here that only specific small amounts of specific diols lead to good properties, whereas higher amounts are surprisingly disadvantageous. It was surprising that the incorporation of even small amounts of additional diols significantly increases surface renewal and hence the molecular weight. A particular surprise was that branched diols are readily incorporated into the polymer chain by condensation despite steric hindrance. A person skilled in the art would have expected the steric hindrance to impede the increase in molecular weight. Overall, therefore, it was possible to provide polyestercarbonates the constituent structural elements of which on the one hand are responsible for a good balance between rigidity and flexibility of the polymer chains, and which on the other hand also exhibit a sufficiently high molecular weight overall, which results in correspondingly good mechanical properties.

It has likewise surprisingly found that the incorporation of the additional aliphatic dihydroxy compounds HO—X—OH, which have branches, leads of polymers having a lower shear viscosity. This is preferably the case even when there is a relatively high solution viscosity. This is likewise preferably the case even when there is a comparable Tg.

The process for preparing a polyestercarbonate according to the invention may be described schematically, for example by the reaction of cyclohexanedicarboxylic acid, isosorbide, an additional diol HO—R—OH and diphenyl carbonate, as follows:

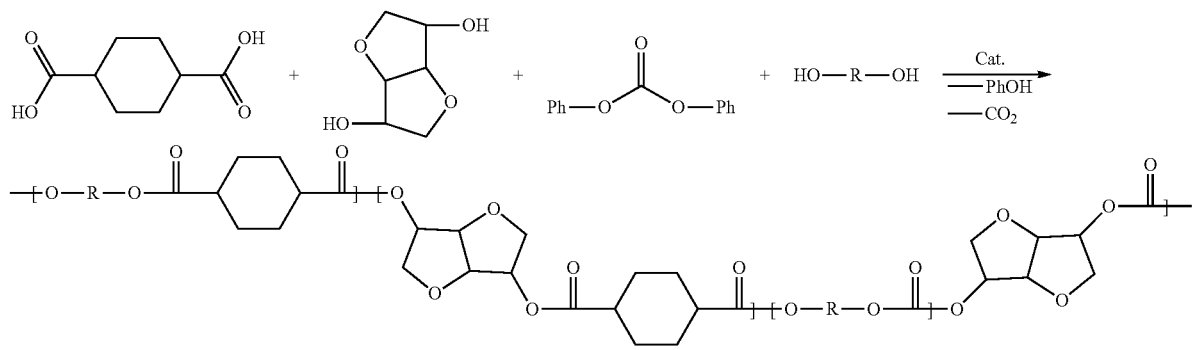

(the naming of these specific three starting substances serves merely to elucidate the invention and should not be understood as limiting)

In the direct synthesis according to the invention, evolution of gas was initially observed (carbon dioxide escaped). If a sample of the mixture is taken once the evolution of gas has essentially subsided, it can be analytically demonstrated that oligomers have already formed. These oligomers undergo condensation in a further step to give the polyestercarbonate according to the invention. The invention accordingly provides a polyestercarbonate, comprising the structural formula (1)

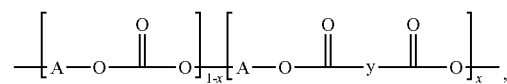

in which

A independently per repeating unit represents at least either structural unit (A) or structural unit (B), where (A) represents chemical formula (2)

and (B) represents chemical formula (3)

*—X—*    (3), where x represents a branched alkylene group having 4 to 20, preferably 5 to 15 carbon atoms, which may optionally be interrupted by at least one heteroatom, or a cycloalkylene group comprising at least one branch, wherein the cycloalkylene group has 4 to 20, preferably 5 to 15 carbon atoms, may optionally be interrupted by at least one heteroatom and wherein the cycloalkylene group may optionally contain a plurality of rings, y each independently represents chemical formula (IIIa) or (IIIb)

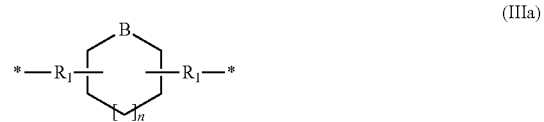

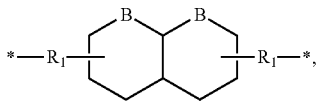

(IIIb)

in which B each independently represents a CH$_2$ group or a heteroatom selected from the group consisting of O and S, preferably a CH$_2$ group or an oxygen atom, R$_1$ each independently represents a single bond or an alkylene group having 1 to 10 carbon atoms, preferably a single bond or an alkylene group having 1 to 5 carbon atoms, especially preferably a single bond, n is a number between 0 and 3, preferably 0 or 1, and 0<x<1, where the * in each case indicate the position at which the chemical formulae are incorporated into the polyestercarbonate, characterized in that the polyestercarbonate comprises 98 mol % to 75 mol %, preferably 97 mol % to 80 mol %, especially preferably 96 mol % to 82 mol % of structural unit (A) and 2 mol % to 25 mol %, preferably 3 mol % to 20 mol %, especially preferably 4 mol % to 18 mol % of structural unit (B), based in each case on the sum of the structural units (A) and (B), and in that the polyestercarbonate has a relative solution viscosity, measured in dichloromethane at a concentration of 5 g/l at 25° C. with an Ubbelohde viscometer, of 1.20 to 1.70, preferably 1.23 to 1.67, especially preferably 1.25 to 1.65.

In structural formula (1), constituent "A" is defined in more detail. A may represent either at least (A) or (B). This can be freely selected independently for each repeating unit. According to the invention, the term "repeating unit" preferably refers to the structure framed either by "[ . . . ]$_1$x" or by "[ . . . ]x". Structural formula (1) thus already includes two different repeating units which have either a carbonate structure or an ester structure in addition to A. A, independently per repeating unit of structural formula (1), represents at least either structural unit (A) or structural unit (B). In this case, the use of the term "at least" means that A may also represent a further structural unit (C). However, the polyestercarbonate according to the invention necessarily always comprises structural units (A) and (B) in the defined molar ratios with respect to one another. Preferably, A consists only of the structural units (A) and (B) and does not include any further structural unit (C). In this case, A, independently per repeating unit of structural formula (1), represents either structural unit (A) or structural unit (B). In addition, it is apparent to a person skilled in the art that (A) may comprise two or more different structures of formula (2). Likewise, (B) may comprise two or more different structures of formula (3). However, (A) preferably comprises just one structure of formula (2). Likewise preferably, however, (B) comprises just one structure of formula (3). Particularly preferably, (A) and (B) comprise just one structure of formula (2) and (3), respectively.

It has surprisingly been found that, when the amount of component (B) is within the range defined in the claims, the increase in molecular weight functions particularly well so that a polyestercarbonate can be obtained having a relative solution viscosity of 1.20 to 1.70. If the amount of (B) is higher, there is surprisingly only a minor increase in molecular weight. It was advantageous in this case for (B) to have 2 to 11, preferably 3 to 10 carbon atoms. Polyestercarbonates were obtained having good mechanical properties, in particular good elongations at break and good moduli of elasticity. Moreover, the polyestercarbonates according to the invention exhibit a good impact strength.

According to the invention, a distinction is made between a repeating unit, a structural unit and a structural motif. Preferably, as already described above, a repeating unit is understood to mean the structure which is framed in formula (1) by the brackets [ . . . ]$_{1-x}$ or the brackets [ . . . ]$_x$. Structural formula (1) thus already includes two repeating units. As a result of A, it also additionally has at least the structural units (A) and (B). The structural units (A) and (B) (and possibly also (C)) are each present once in a repeating unit. They can be different for each repeating unit. According to the invention, the term structural unit is preferably used for a structure which is not a repeating unit per se since it has neither a carbonate structure nor an ester structure. In addition, it is not a structural motif. The term is therefore used for a structure which is smaller than a repeating unit and a structural motif. According to the invention, a structural motif is preferably understood to mean a structure which can be derived from an employed monomer by reaction to form the polymer. According to the invention, a structural motif is thus understood to mean at least the following structures:

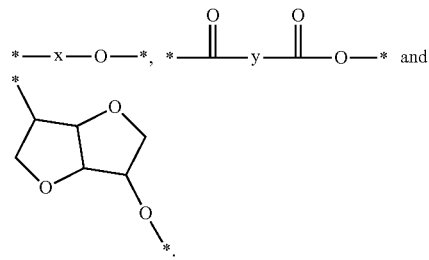

The first structural motif is derived from a diol, which is incorporated into the polymer of structural formula (1) by reaction. The oxygen is thus part of either the carbonate unit or the ester unit in structural formula (1). The second structural motif is similarly derived from a dicarboxylic acid. The third structural motif is likewise similarly derived from a 1,4:3,6-dianhydrohexitol.

In contrast to this, a structural unit according to the invention therefore does not include an oxygen and is thus not directly assignable to a monomer. Structural unit (A) thus corresponds to the structural motif

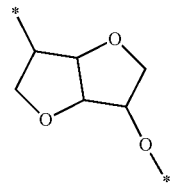

excluding the oxygen atom. Structural unit (B) corresponds to the structural motif *—X—O—* excluding the oxygen atom.

It is preferable in particular for the polyestercarbonate according to the invention to be characterized in that the polyestercarbonate comprises the following repeating units (i) to (iv) in any order

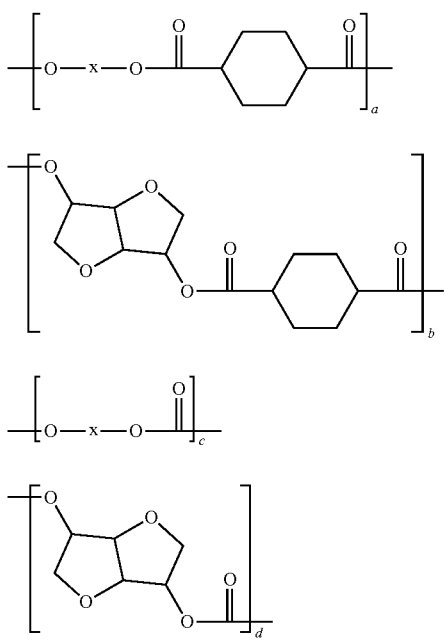

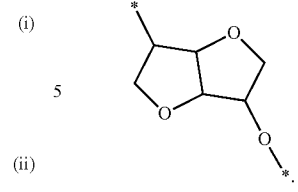

in which a, b, c and d each independently represent a natural number which indicates the average number of repeating units in each case. Here too, the repeating units are framed by brackets. The indices a, b, c and d are preferably set so as to result in the solution viscosity according to the invention. It was surprising according to the invention that the numbers a, b, c and d are so high that sufficiently high molecular weights were obtained.

It is preferable according to the invention for the polyestercarbonate to consist of structural formula (1) to an extent of at least 80% by weight, preferably 85% by weight, particularly preferably 90% by weight, based on the total weight of the polyestercarbonate. The polyestercarbonate according to the invention therefore preferably has only small amounts of structures other than the structures defined in structural formula (1). It is furthermore preferable for the polyestercarbonate according to the invention not to comprise any functional structures other than carbonate and/or ester structures. This means that the not more than 20% by weight, preferably not more than 15% by weight, and particularly preferably not more than 10% by weight which does not consist of structural formula (1) can preferably be derived from other diols or dicarboxylic acids which in turn lead to carbonate or ester structures as a result of incorporation into the polyestercarbonate.

It is preferable for the polyestercarbonate according to the invention to be characterized in that 1 mol % to 20 mol %, preferably 2 mol % to 18 mol %, especially preferably 3 mol % to 15 mol % of the polyestercarbonate consists of the structural motif *—X—O—*, based on the total sum of the following structural motifs

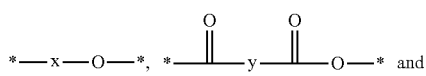

According to the invention, the ratio of the employed monomers having hydroxy functionalities to dicarboxylic acids can be freely adjusted in the polyestercarbonate. The more dihydroxy compounds are used, the more carbonate structures result. The more dicarboxylic acid, the more ester structures. As a result, the ratio of carbonate structures to ester structures is therefore likewise freely selectable. It has been shown that this is down in particular to the process according to the invention, in which all of the monomers which form the polyestercarbonate are already present at the start of the synthesis. This therefore leads to polyestercarbonates having properties which can be adjusted in a controlled manner. To this end, however, the ratio of the two dihydroxy compounds which lead to structural units (A) and (B) must be kept within the range according to the invention. It has been found to be advantageous when the amount of the structural motif *—X—O—*, which without the oxygen atom constitutes the structural unit (B), is not too high. If it is too low, the increase in molecular weight is poorer overall. If it is too high, then the glass transition temperature of the polyestercarbonate is not optimal. The sum of the carbonate structures always results here from the sum of the dihydroxy compounds and dicarboxylic acids used.

Preferably, (A) is selected from at least one of the structures

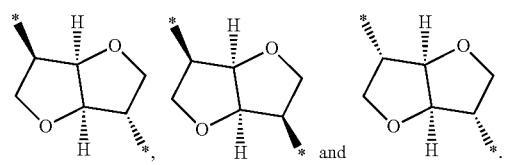

(A) is very particularly preferably

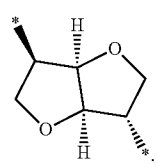

Preferably, x represents a branched alkylene group having 4 to 20, preferably 5 to 15 carbon atoms, particularly preferably 5 to 11 carbon atoms, very particularly preferably 5 to 10 carbon atoms, which may optionally be interrupted by at least one heteroatom. The heteroatom which may optionally interrupt the branched alkylene group is preferably oxygen or sulfur, particularly preferably oxygen. The branched alkylene group particularly preferably contains just one heteroatom or no heteroatoms. The branched alkylene group particularly preferably does not have any heteroatoms. When there is at least one heteroatom present in the alkylene group, the number of carbon atoms indicated refers to the total number of carbon atoms in the alkylene group. For example, the group —CH$_2$—CH$_2$—O—CH$_2$—CH$_2$— contains 4 carbon atoms. The term "branched" is understood to refer to the branches on aliphatic carbon chains as known to a person skilled in the art. This means that the branched alkylene group preferably comprises at least one tertiary and/or at least one quaternary carbon atom. More than one branch may be present in the branched alkylene group. The branches preferably have chain lengths of 1 to 5 carbon atoms, particularly preferably 1 to 4, very particularly preferably 1 to 3 carbon atoms. These carbon atoms of the branches count towards the total carbon number of the branched alkylene group. This means, for example, that a branched alkylene group —CH$_2$—C(CH$_3$)$_2$—CH$_2$— has 5 carbon atoms.

If, according to the invention, x is a cycloalkylene group having at least one branch and wherein the cycloalkylene group has 4 to 20, preferably 5 to 15 carbon atoms, may optionally be interrupted by at least one heteroatom and wherein the cycloalkylene group may optionally contain a plurality of rings, then the statements above apply to the heteroatom. The heteroatom which may optionally interrupt the cycloalkylene group is preferably oxygen or sulfur, particularly preferably oxygen. The cycloalkylene group particularly preferably contains just one heteroatom or no heteroatoms. The cycloalkylene group particularly preferably does not have any heteroatoms. Preferably, the cycloalkylene group has at least one, preferably one, ring having 4 to 6 carbon atoms. In particular, it is preferable for the cycloalkylene group to have a total of 4 to 20, preferably 5 to 15 carbon atoms and a ring having 4 to 5 carbon atoms. The carbon atoms of the ring in this case count towards the total number of carbon atoms in the cycloalkylene group. This means that a tetramethylcyclobutenyl group has a total of 8 carbon atoms, including a ring having 4 carbon atoms. In addition, the cycloalkylene group has at least one branch. These branches may be present in the cycloaliphatic chain possibly present and/or in the ring. The branches are preferably present in the ring. The term "branch" in relation to the cycloalkylene group is understood to refer to the branches known to a person skilled in the art. This means that the branched cycloalkylene group preferably comprises at least one tertiary and/or at least one quaternary carbon atom. It can be seen here that the two tertiary carbon atoms which connect the ring to the polymer chain are not understood to be branches according to the invention. This preferably means that, when the cycloalkylene group has at least one branch at least on the ring, this ring then has at least one tertiary and/or quaternary carbon atom in addition to the two tertiary carbon atoms which connect the ring to the polymer chain (see also the "*" in formula (3)). Likewise, it is also possible for the branch to be present in an alkyl group which is present on the ring (when x is for example 2,2-bis(4-cyclohexylene)propane). Particularly preferably, "branched" in relation to the cycloalkylene group is understood to mean that the group has at least one quaternary carbon atom. Preferably, x is a cycloalkylene group having 5 to 15 carbon atoms comprising a ring, which optionally has at least one branch, preferably has at least one branch and has at least one ring, preferably a ring having 4 to 6 carbon atoms, particularly preferably 4 to 5 carbon atoms.

In total, it is preferable according to the invention for x to have 2 to 10 carbon atoms.

Particularly preferably, *—X—* is selected from the group consisting of 2,2-bis(4-cyclohexylene)propane, 2-butyl-2-ethyl-1,3-propylene, 2,2,4,4-tetramethyl-1,3-cyclobutylene, 2,2,4-trimethyl-1,3-pentylene, 2,2-dimethylpropan-1,3-ylene, 8-(methylene)-3-tricyclo[5.2.1.02,6]decanyl]methylene and any desired mixtures thereof. It is particularly preferable for x in *—X—* to be selected from the group consisting of 2-butyl-2-ethyl-1,3-propylene, 2,2,4,4-tetramethyl-1,3-cyclobutylene, 2,2,4-trimethyl-1,3-pentylene, 2,2-dimethylpropan-1,3-ylene, and any desired mixtures thereof. It is likewise preferable for x in *—X—* to be selected from the group consisting of 2-butyl-2-ethyl-1,3-propylene, 2,2,4,4-tetramethyl-1,3-cyclobutylene, 2,2,4-trimethyl-1,3-pentylene, 2,2-dimethylpropan-1,3-ylene and any desired mixtures thereof. It is very particularly preferable for x in *—X—* to be selected from the group consisting of 2-butyl-2-ethyl-1,3-propylene, 2,2,4,4-tetramethyl-1,3-cyclobutylene, 2,2,4-trimethyl-1,3-pentylene, 2,2-dimethylpropan-1,3-ylene, and any desired mixtures thereof. As already explained above, x may be a mixture of the structures mentioned above. However, x preferably represents just one of the structures.

According to the invention, y each independently represents chemical formula (IIIa) or (IIIb)

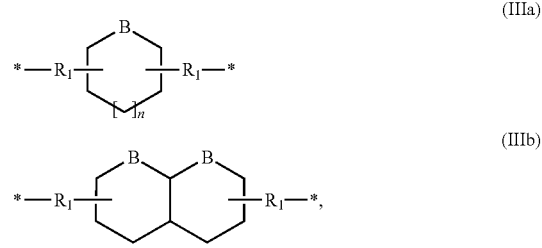

in which B each independently represents a carbon atom or a heteroatom selected from the group consisting of O and S, preferably a carbon atom or an oxygen atom,
R$_1$ each independently represents a single bond or an alkylene group having 1 to 10 carbon atoms, preferably a single bond or an alkylene group having 1 to 5 carbon atoms, especially preferably a single bond,
n is a number between 0 and 3, preferably 0 or 1.

It will be understood that, when R$_1$ represents a single bond, R$_1$ thus comprises zero carbon atoms.

It is preferable in particular for y to be selected from the group consisting of 1,2-cyclohexylene, 1,3-cyclohexylene, 1,4-cyclohexylene, 1,2-cyclohexanedimethylene, 1,3-cyclohexanedimethylene, 1,4-cyclohexanedimethylene, 2,2-bis(4-cyclohexylene)propane, tetrahydro-2,5-furandimethylene, 2-butyl-2-ethyl-1,3-propylene, 2-(2-ethyloxy)ethylene, 2,2,4,4-tetramethyl-1,3-cyclobutylene, 2,2,4-trimethyl-1,3-pentylene, 2,2-dimethylpropan-1,3-ylene, cyclobutane-1,1-diyldimethylene, 8-(methylene)-3-tricyclo[5.2.1.02,6]decanyl]methylene, 1,2-propylene, 1,3-propanylene, 1,4-butylene, 1,5-pentylene, 1,6-hexylene, 1,8-octylene and any desired mixtures thereof. Particularly preferably, y is selected from the group consisting of 1,2-cyclohexylene, 1,3-cyclohexylene and 1,4-cyclohexylene.

In addition, small amounts of further acids may also be used alongside the mentioned structures for y. Particularly preferably, y thus additionally includes up to 20 mol %, more preferably up to 10 mol % and very particularly preferably up to 5 mol % of a structural formula y1 and/or y2. Preferably, y1 does not comprise a ring. Particularly preferably, y1 is selected from the group consisting of 2,2,4-trimethylbutylene, 2,4,4-trimethylbutylene, 2,2,5-trimethylbutylene and 3,3-dimethylpropylene. It is likewise preferable for y2 to be selected from the group consisting of structures derived from the following dicarboxylic acids: isophthalic acid, terephthalic acid, 2,5-furandicarboxylic acid and 2,6-naphthalenedicarboxylic acid. It can be seen here that the ester group formed does not belong to the structural unit y2. In these cases, reference is still preferably made according to the invention to an aliphatic polyestercarbonate. Particularly preferably, however, the polyestercarbonate according to the invention does not contain any aromatic structures that are derived from aromatic dicarboxylic acids.

It is preferable for the polyestercarbonate according to the invention to be characterized in that the molar ratio of the sum of the structural motifs *—X—O—* and

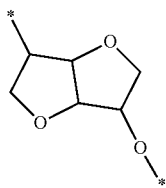 [SMILES: *OC1COC2C(*)COC12]

to the structural motif

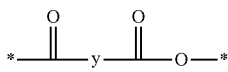

is 6:4 to 9:1, preferably 7:3 to 8:2. As already explained above, this ratio is freely selectable in the polyestercarbonate according to the invention. A good balance between rigidity and flexibility of the polymer chains is thereby achieved, which leads to correspondingly good mechanical properties.

It is likewise preferable for the polyestercarbonate according to the invention to be characterized in that at least 45 mol %, preferably at least 50 mol % of the polyestercarbonate consists of the structural motif

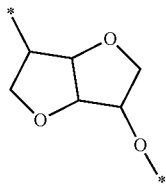 [SMILES: *OC1COC2C(*)COC12]

based on the total sum of the following structural motifs

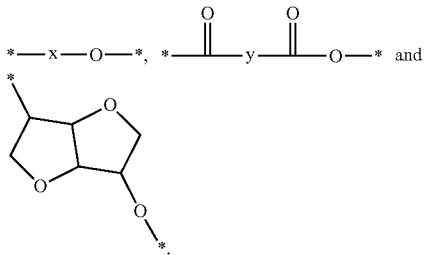

This amount is particularly advantageous for achieving a high glass transition temperature. Furthermore, it is also not ruled out according to the invention that A additionally represents the structural unit (C). (C) comprises aromatic structures. However, these are preferably present only in small proportions. Preferably, (C) is additionally present to an extent of up to 20 mol %, more preferably up to 10 mol % and very particularly preferably up to 5 mol %, based on the total sum of the structural units (A), (B) and (C). The ratio of (A) and (B) defined in the claims remains the same in this case. In these cases, reference is still preferably made according to the invention to an aliphatic polyestercarbonate. However, the polyestercarbonate according to the invention particularly preferably does not have any structural unit (C). Likewise, it is preferable for the polyestercarbonate according to the invention to include neither a structural unit (C) nor an aromatic structural unit y2. In general, aromatic compounds in polyestercarbonates lower the UV stability and weathering resistance of the latter. This is particularly disadvantageous for outdoor applications. Moreover, aromatic components in a polyestercarbonate reduce the surface hardness of molded articles produced therefrom, which may give rise to the need for coating. Furthermore, diphenyl esters of aromatic acids, which may arise as intermediates, are for example stable intermediates which can slow down the polycondensation. As a result, further specific catalysts may possibly need to be used. It is accordingly preferable for A to consist of (A) and (B).

These additional structural units (C) are preferably selected from the group of structural units derived from the following diols: bisphenol A, 1,1-bis(4-hydroxyphenyl)-3,3,5-trimethylcyclohexane, 4,4'-dihydroxydiphenyl (DOD), 4,4'-dihydroxydiphenyl ether (DOD ether), bisphenol B, bisphenol M, bisphenols (I) to (III)

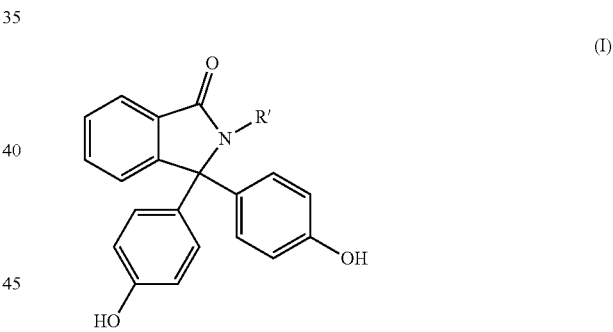

(I)

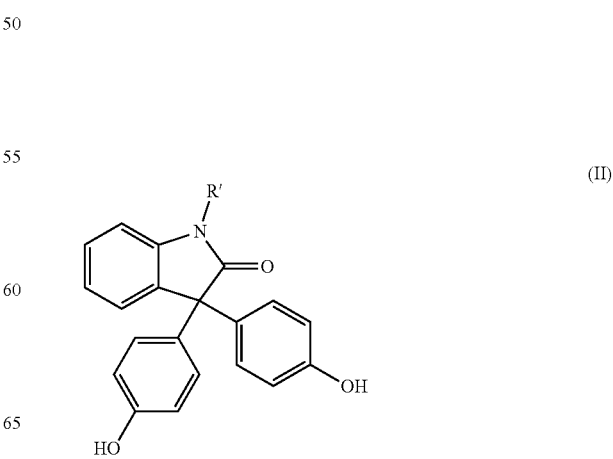

(II)

-continued

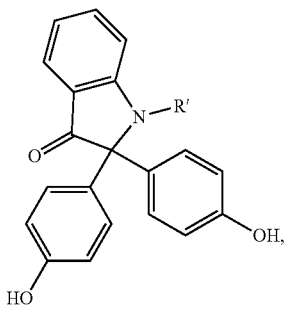
(III)

where in these formulae (I) to (III), R' in each case represents C1-C4 alkyl, aralkyl or aryl, preferably methyl or phenyl, very particularly preferably methyl. According to the invention, the expression "derived from" preferably means that the corresponding monomer is introduced into the formed polyestercarbonate via the hydroxyl group or else acid group, either by formation of an ester group or by formation of a carbonate group.

According to the invention, it is preferable, when further units are present for structural formula (1) or in structural formula (1), for the mol % and ratios defined above to be retained. The molar amount of the respective newly defined unit is then included therein.

It is likewise preferable for the defined mol % in the polyestercarbonate according to the invention to be determined by $^1$H NMR. This method is known to a person skilled in the art. The polyestercarbonate may for example be dissolved in $CDCl_3$ and the corresponding peaks of the structural units identified. The ratios and proportions can be determined via the integrals. On the other hand, the mol % according to the invention may also be determined via the employed molar amounts and ratios of the monomers. It has to be assumed in this case that all monomers are fully incorporated into the polyestercarbonate in the same ratio. A person skilled in the art may thus also set the ratio in advance.

The polyestercarbonate according to the invention has a relative solution viscosity of 1.20 to 1.70, preferably 1.23 to 1.67, particularly preferably 1.25 to 1.65. The relative solution viscosity ($\eta$rel; also referred to as eta rel) was determined in dichloromethane at a concentration of 5 g/l at 25° C. with an Ubbelohde viscometer. A person skilled in the art is familiar with the determination of the relative solution viscosity by means of an Ubbelohde viscometer. According to the invention, this is preferably carried out in accordance with DIN 51562-3; 1985-05. This method involves measuring the flow times of the polyestercarbonate to be measured through the Ubbelohde viscometer in order to then ascertain the difference in viscosity between the polymer solution and its solvent. For this purpose, the Ubbelohde viscometer is first calibrated by measuring the pure solvents dichloromethane, trichloroethylene and tetrachloroethylene (always performing at least 3 measurements, but at most 9 measurements). This is followed by the calibration proper using the solvent dichloromethane. The polymer sample is then weighed out, dissolved in dichloromethane and then the flow time is determined three times for this solution. The mean value for the flow times is corrected via the Hagenbach correction and the relative solution viscosity calculated.

Here, a method how eta rel is determined.

In a further aspect of the present invention, a process for preparing the polyestercarbonate according to the invention by means of melt transesterification is provided, comprising the steps of (i) reaction at least of at least one dicarboxylic acid of chemical formula (IIa) or (IIb)

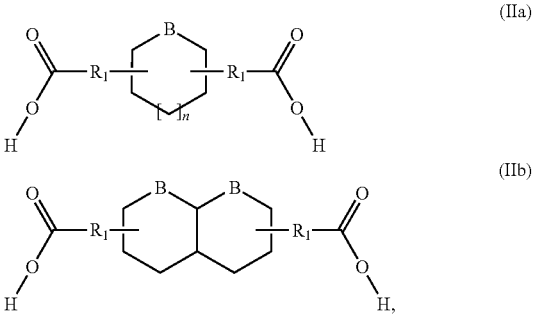

in which
B each independently represents a $CH_2$ group or a heteroatom selected from the group consisting of O and S, preferably a $CH_2$ group or an oxygen atom,
$R_1$ each independently represents a single bond or an alkylene group having 1 to 10 carbon atoms, preferably a single bond or an alkylene group having 1 to 5 carbon atoms, especially preferably a single bond, and
n is a number between 0 and 3, preferably 0 or 1,
with at least one diaryl carbonate using at least one catalyst and in the presence of a mixture of dihydroxy compounds, comprising component (A) at least one 1,4:3,6-dianhydrohexitol and component (B) at least one further aliphatic dihydroxy compound of chemical formula (I)

HO—X—OH  (I), in which X represents a branched alkylene group having 4 to 20, preferably 5 to 15 carbon atoms, which may optionally be interrupted by at least one heteroatom, or a cycloalkylene group comprising at least one branch, wherein the cycloalkylene group has 4 to 20, preferably 5 to 15 carbon atoms, may optionally be interrupted by at least one heteroatom and wherein the cycloalkylene group may optionally contain a plurality of rings, and
(ii) further condensation of the mixture obtained from process step (i), at least with removal of the chemical compound eliminated in the condensation,
characterized in that the mixture of dihydroxy compounds comprises
98 mol % to 75 mol %, preferably 97 mol % to 80 mol %, especially preferably 96 mol % to 82 mol % of component (A) and
2 mol % to 25 mol %, preferably 3 mol % to 20 mol %, especially preferably 4 mol % to 18 mol % of component (B),
based in each case on the sum of components (A) and (B). According to the invention, in process step (i) there is at least the reaction of at least one cycloaliphatic dicarboxylic acid with at least one diaryl carbonate. However, further reaction cannot be ruled out according to the invention as a result of the presence of the at least one 1,4:3,6-dianhydrohexitol (hereinafter also component (A)) and the at least one further aliphatic dihydroxy compound (hereinafter also component (B)) (it should be noted here that component (A) and component (B) subsequently lead to the structural units (A) and (B) in the polyestercarbonate according to the invention). In fact, examples have demonstrated that oligomers form as early as in process step (i), these oligomers having a mass spacing in a MALDI-ToF mass spectrometer which corresponds to a unit formed from component (A) and/or component (B) with carbonate (with loss of the two hydroxy groups). This means that in process step (i) further reaction may take place in addition to the formation of the diester. However, in accordance with the invention this also means that the reaction of all cycloaliphatic dicarboxylic acid present with the stoichiometric equivalent of diaryl carbonates does not need to have taken place to completion before process step (ii) is initiated. However, preference according to the invention is given to conducting process step (i) until a substantial abatement in gas formation can be observed and only then initiating process step (ii), for example by applying a vacuum to remove the chemical compound eliminated during the condensation. As has already been stated above, however, it is optionally possible for process steps (i) and (ii) to not be clearly demarcated from one another according to the invention.

Process Step (i)

The process according to the invention is referred to as a direct synthesis or else one-pot synthesis, since in process step (i) all of the structural elements that form the subsequent polyestercarbonate are already present as monomers. This preferably means that, according to the invention, all aliphatic dihydroxy compounds (in each case component (A) and (B)), all cycloaliphatic dicarboxylic acids and also all diaryl carbonates are present in this step, even when more than just the dihydroxy compounds of components (A) and (B), a cycloaliphatic dicarboxylic acid and/or a diaryl carbonate are involved. It is therefore preferable according to the invention for all monomers which undergo condensation in process step (ii) to give the polyestercarbonate to already be present during process step (i). The invention can also include the embodiment in which a small proportion of the at least one diaryl carbonate is additionally added in process step (ii). This may be used selectively in order to reduce the OH end group content of the resulting polyestercarbonate. Such an approach is described for example in JP2010077398 A. In this case, however, in order that it is still the case that all structural elements that form the subsequent polyestercarbonate are present as monomers in process step (i) and no further structural elements are added, it is necessary for the at least one diaryl carbonate that is added in small amounts in process step (ii) to correspond to the at least one diaryl carbonate present in process step (i). The process can in this sense therefore still be referred to as a direct synthesis or one-pot synthesis.

Furthermore, the presence in process step (i) of aromatic dihydroxy compounds and/or aromatic dicarboxylic acids is not ruled out according to the invention. However, these are preferably present only in small proportions. It is particularly preferable in process step (i) for additionally up to 20 mol %, more preferably up to 10 mol % and very particularly preferably up to 5 mol % of an aromatic dihydroxy compound (component (C)) to be present, based on the total molar amount of the dihydroxy compound used. The ratio of components (A) and (B) defined in the claims remains the same here. It is likewise particularly preferable in process step (i) for additionally up to 20 mol %, more preferably up to 10 mol % and very particularly preferably up to 5 mol % of an aromatic dicarboxylic acid to be present, possibly also in addition to the aromatic dihydroxy compound, based on the total molar amount of the dicarboxylic acid used. In these cases, reference is still preferably made according to the invention to an aliphatic polyestercarbonate. However, it is particularly preferable for no aromatic dihydroxy compound to be used in process step (i). It is likewise preferable for no aromatic dicarboxylic acid to be used in process step (i). Equally, it is preferable for neither an aromatic dihydroxy compound nor an aromatic dicarboxylic acid to be used in process step (i). In general, aromatic compounds in polyestercarbonates lower the UV stability and weathering resistance of the latter. This is particularly disadvantageous for outdoor applications. Moreover, aromatic components in a polyestercarbonate reduce the surface hardness of molded articles produced therefrom, which may give rise to the need for coating. Furthermore, diphenyl esters of aromatic acids which may arise as intermediates, are for example stable intermediates which can slow down the polycondensation. As a result, further specific catalysts may possibly need to be used.

These additional aromatic dihydroxy compounds (component (C)) are preferably selected from the group consisting of bisphenol A, 1,1-bis(4-hydroxyphenyl)-3,3,5-trimethylcyclohexane, 4,4'-dihydroxydiphenyl (DOD), 4,4'-dihydroxydiphenyl ether (DOD ether), bisphenol B, bisphenol M, bisphenols (I) to (III)

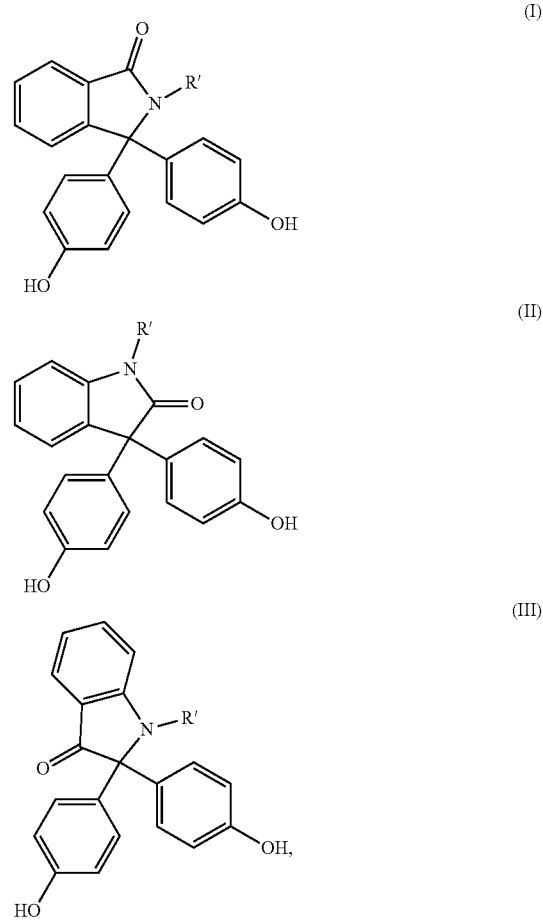

where in these formulae (I) to (III), R' in each case represents C1-C4 alkyl, aralkyl or aryl, preferably methyl or phenyl, very particularly preferably methyl.

These additional aromatic dicarboxylic acids are preferably selected from the group consisting of isophthalic acid, terephthalic acid, 2,5-furandicarboxylic acid and 2,6-naphthalenedicarboxylic acid. It is known that small proportions of these aromatic diacids can reduce the water absorption of an aliphatic polyestercarbonate.

According to the invention, at least one 1,4:3,6-dianhydrohexitol is used as component (A) in process step (i). As is known to a person skilled in the art, 1,4:3,6-dianhydrohexitols are generally selected from the group consisting of isomannide, isoidide and isosorbide. This may involve a bio-based structural element, which is accompanied by all of the advantages of a bio-based monomer and the resulting polymer (e.g. better sustainability since it can be obtained from renewable raw materials). The process according to the invention is particularly preferably characterized in that the at least one 1,4:3,6-dianhydrohexitol is isosorbide. It is preferable for component (A) to consist of isosorbide.

According to the invention, at least one further aliphatic dihydroxy compound (component (B)) is used in process step (i). It is preferable for component (B) to consist of two further aliphatic dihydroxy compounds. It is likewise preferable for component (B) to consist of one further aliphatic dihydroxy compound. Thus, it is particularly preferable for component (A) to consist of isosorbide and for component (B) to consist of a further aliphatic dihydroxy compound. A component (C), which comprises an aromatic dihydroxy compound (see above), may optionally also be present in the mixture of dihydroxy compounds.

It is preferable here for the at least one further aliphatic dihydroxy compound to have the chemical formula (I):

$$\text{HO—X—OH} \qquad (I),$$

in which X represents a linear alkylene group having 2 to 22, preferably 2 to 15 carbon atoms, particularly preferably 2 to 10 carbon atoms, which may optionally be interrupted by at least one heteroatom, a branched alkylene group having 4 to 20, preferably 5 to 15 carbon atoms, which may optionally be interrupted by at least one heteroatom, or a cycloalkylene group having 4 to 20, preferably 5 to 15 carbon atoms, which may optionally be interrupted by at least one heteroatom and wherein the cycloalkylene group may optionally contain a plurality of rings and may in each case optionally be branched.

It is particularly preferable in formula (I) for X to represent a branched alkylene group having 4 to 20, preferably 5 to 15 carbon atoms, which may optionally be interrupted by at least one heteroatom, or a cycloalkylene group comprising at least one branch, wherein the cycloalkylene group has 4 to 20, preferably 5 to 15 carbon atoms, may optionally be interrupted by at least one heteroatom and wherein the cycloalkylene group may optionally contain a plurality of rings.

If X according to the invention is a linear alkylene group which may optionally be interrupted by at least one heteroatom, then this preferably has 2 to 15, particularly preferably 2 to 12, very particularly preferably 2 to 11, especially preferably 2 to 10, more preferably 2 to 6 and more preferably 3 to 4 carbon atoms. The heteroatom which may optionally interrupt the alkylene group is preferably oxygen or sulfur, particularly preferably oxygen. The alkylene group particularly preferably contains just one heteroatom or no heteroatoms. When there is at least one heteroatom present in the alkylene group, the number of carbon atoms indicated refers to the total number of carbon atoms in the alkylene group. For example, the group —CH$_2$—CH$_2$—O—CH$_2$—CH$_2$— contains 4 carbon atoms. It is preferable according to the invention for the linear alkylene group which may optionally be interrupted by at least one heteroatom to have fewer than 12, particularly preferably fewer than 10 carbon atoms. The alkylene group particularly preferably does not have any heteroatoms.

Preferably, X represents a branched alkylene group having 4 to 20, preferably 5 to 15 carbon atoms, particularly preferably 5 to 11 carbon atoms, very particularly preferably 5 to 10 carbon atoms, which may optionally be interrupted by at least one heteroatom. The heteroatom which may optionally interrupt the branched alkylene group is preferably oxygen or sulfur, particularly preferably oxygen. The branched alkylene group particularly preferably contains just one heteroatom or no heteroatoms. The branched alkylene group particularly preferably does not have any heteroatoms. When there is at least one heteroatom present in the alkylene group, the number of carbon atoms indicated refers to the total number of carbon atoms in the alkylene group. For example, the group —CH$_2$—CH$_2$—O—CH$_2$—CH$_2$— contains 4 carbon atoms. The term "branched" is understood to refer to the branches on aliphatic carbon chains as known to a person skilled in the art. This means that the branched alkylene group preferably comprises at least one tertiary and/or at least one quaternary carbon atom. More than one branch may be present in the branched alkylene group. The branches preferably have chain lengths of 1 to 5 carbon atoms, particularly preferably 1 to 4, very particularly preferably 1 to 3 carbon atoms. These carbon atoms of the branches count towards the total carbon number of the branched alkylene group. This means, for example, that a branched alkylene group —CH$_2$—C(CH$_3$)$_2$—CH$_2$— has 5 carbon atoms.

If, according to the invention, X is a cycloalkylene group having 4 to 20, preferably 5 to 15 carbon atoms, which may optionally be interrupted by at least one heteroatom and wherein the cycloalkylene group may optionally contain a plurality of rings and may in each case optionally be branched, then the statements above apply to the heteroatom. The heteroatom which may optionally interrupt the cycloalkylene group is preferably oxygen or sulfur, particularly preferably oxygen. The cycloalkylene group particularly preferably contains just one heteroatom or no heteroatoms. The cycloalkylene group particularly preferably does not have any heteroatoms. Preferably, the cycloalkylene group has at least one, preferably one, ring having 4 to 6 carbon atoms. In particular, it is preferable for the cycloalkylene group to have a total of 4 to 20, preferably 5 to 15 carbon atoms and a ring having 4 to 5 carbon atoms. The carbon atoms of the ring in this case count towards the total number of carbon atoms in the cycloalkylene group. This means that a tetramethylcyclobutenyl group has a total of 8 carbon atoms, including a ring having 4 carbon atoms. The cycloalkylene group may in addition have at least one branch. Particular preference is given to this. When branches are present, they may be present in the cycloaliphatic chain possibly present and/or in the ring. The branches are preferably present in the ring. Preferably, X is a cycloalkylene group having 5 to 15 carbon atoms comprising a ring, which optionally has at least one branch, preferably has at least one branch and has at least one ring, preferably a ring having 4 to 6 carbon atoms, particularly preferably 4 to 5 carbon atoms.

If, according to the invention, X is a branched cycloalkylene group having 4 to 20, preferably 5 to 15 carbon atoms, which may optionally be interrupted by at least one heteroatom and wherein the cycloalkylene group may optionally contain a plurality of rings, then the statements above apply to the heteroatom. The heteroatom which may optionally interrupt the cycloalkylene group is preferably oxygen or sulfur, particularly preferably oxygen. The cycloalkylene group particularly preferably contains just one heteroatom or no heteroatoms. The cycloalkylene group particularly preferably does not have any heteroatoms. Preferably, the cycloalkylene group has at least one, preferably one, ring having 4 to 6 carbon atoms. In particular, it is preferable for the cycloalkylene group to have a total of 4 to 20, preferably 5 to 15 carbon atoms and a ring having 4 to 5 carbon atoms. The carbon atoms of the ring in this case count towards the total number of carbon atoms in the cycloalkylene group. This means that a tetramethylcyclobutenyl group has a total of 8 carbon atoms, including a ring having 4 carbon atoms. In addition, the cycloalkylene group has at least one branch. The branches may be present in the cycloaliphatic chain possibly present and/or in the ring. The branches are preferably present in the ring. The term "branch" in relation to the cycloalkylene group is understood to refer to the branches known to a person skilled in the art. This means that the branched cycloalkylene group preferably comprises at least one tertiary and/or at least one quaternary carbon atom. It can be seen here that the two tertiary carbon atoms which connect the ring to the polymer chain are not understood to be branches according to the invention. This preferably means that, when the cycloalkylene group has at least one branch at least on the ring, this ring then has at least one tertiary and/or quaternary carbon atom in addition to the two tertiary carbon atoms which connect the ring to the polymer chain (see also the "*" in formula (3)). Likewise, it is also possible for the branch to be present in an alkyl group which is present on the ring (when x is for example 2,2-bis(4-cyclohexylene)propane). Particularly preferably, "branched" in relation to the cycloalkylene group is understood to mean that the group has at least one quaternary carbon atom. Preferably, X is a cycloalkylene group having 5 to 15 carbon atoms comprising a ring, which optionally has at least one branch, preferably has at least one branch and has at least one ring, preferably a ring having 4 to 6 carbon atoms, particularly preferably 4 to 5 carbon atoms.

As a whole, it is preferable according to the invention for the at least one further aliphatic dihydroxy compound to have 2 to 10 carbon atoms.

Particularly preferably, the process according to the invention is characterized in that the at least one further aliphatic dihydroxy compound is selected from the group consisting of 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 2,2-bis (4-hydroxycyclohexyl)propane, tetrahydro-2,5-furandimethanol, 2-butyl-2-ethyl-1,3-propanediol, 2-(2-hydroxyethoxy)ethanol, 2,2,4,4-tetramethyl-1,3-cyclobutanediol, 2,2,4-trimethyl-1,3-pentanediol, 2,2-dimethylpropane-1,3-diol, cyclobutane-1,1-diyldimethanol, 8-(hydroxymethyl)-3-tricyclo[5.2.1.02,6]decanyl]methanol, 1,2-propanediol, 1,3-propanediol, 1,4-butanediol, 1,5-pentanediol, 1,6-hexanediol, 1,8-octanediol and any desired mixtures thereof. It is preferable in particular for the at least one further aliphatic dihydroxy compound to be selected from the group consisting of 2-butyl-2-ethyl-1,3-propanediol, 2-(2-hydroxyethoxy)ethanol, 2,2,4,4-tetramethyl-1,3-cyclobutanediol, 2,2,4-trimethyl-1,3-pentanediol, 2,2-dimethylpropane-1,3-diol, cyclobutane-1,1-diyldimethanol, 1,2-propanediol, 1,3-propanediol, 1,4-butanediol, 1,5-pentanediol, 1,6-hexanediol, 1,8-octanediol and any desired mixtures thereof. It is likewise preferable for the at least one further aliphatic dihydroxy compound to be selected from the group consisting of 2-butyl-2-ethyl-1,3-propanediol, 2,2,4,4-tetramethyl-1,3-cyclobutanediol, 2,2,4-trimethyl-1,3-pentanediol, 2,2-dimethylpropane-1,3-diol, cyclobutane-1,1-diyldimethanol, 1,4-butanediol and any desired mixtures thereof. Very particularly preferably, it is preferable for the at least one further aliphatic dihydroxy compound to be selected from the group consisting of 2-butyl-2-ethyl-1,3-propanediol, 2,2,4,4-tetramethyl-1,3-cyclobutanediol, 2,2,4-trimethyl-1,3-pentanediol, 2,2-dimethylpropane-1,3-diol, cyclobutane-1,1-diyldimethanol and any desired mixtures thereof.

It is likewise preferable for the process according to the invention to be characterized in that the at least one further aliphatic dihydroxy compound is selected from the group consisting of 2,2-bis(4-hydroxycyclohexyl)propane, 2-butyl-2-ethyl-1,3-propanediol, 2,2,4,4-tetramethyl-1,3-cyclobutanediol, 2,2,4-trimethyl-1,3-pentanediol, 2,2-dimethylpropane-1,3-diol, 8-(hydroxymethyl)-3-tricyclo[5.2.1.02,6]decanyl]methanol and any desired mixtures thereof. It is preferable in particular for the at least one further aliphatic dihydroxy compound to be selected from the group consisting of 2-butyl-2-ethyl-1,3-propanediol, 2,2,4,4-tetramethyl-1,3-cyclobutanediol, 2,2,4-trimethyl-1,3-pentanediol, 2,2-dimethylpropane-1,3-diol and any desired mixtures thereof. It is likewise preferable for the at least one further aliphatic dihydroxy compound to be selected from the group consisting of 2-butyl-2-ethyl-1,3-propanediol, 2,2,4,4-tetramethyl-1,3-cyclobutanediol, 2,2,4-trimethyl-1,3-pentanediol, 2,2-dimethylpropane-1,3-diol and any desired mixtures thereof. Very particularly preferably, it is preferable for the at least one further aliphatic dihydroxy compound to be selected from the group consisting of 2-butyl-2-ethyl-1,3-propanediol, 2,2,4,4-tetramethyl-1,3-cyclobutanediol, 2,2,4-trimethyl-1,3-pentanediol, 2,2-dimethylpropane-1,3-diol and any desired mixtures thereof.

Likewise, according to the invention at least one cycloaliphatic dicarboxylic acid is used in process step (i). It is preferable here for the at least one cycloaliphatic dicarboxylic acid to be selected from a compound of chemical formula (IIa), (IIb) or mixtures thereof

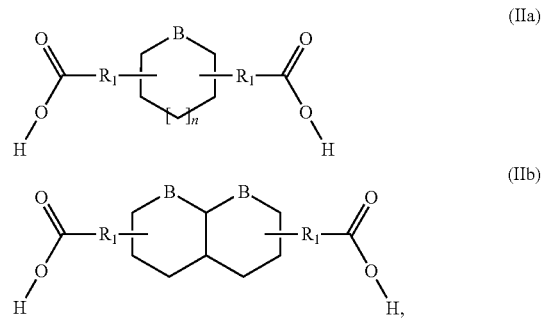

in which
B each independently represents a $CH_2$ group or a heteroatom selected from the group consisting of O and S, preferably a $CH_2$ group or an oxygen atom,
$R_1$ each independently represents a single bond or an alkylene group having 1 to 10 carbon atoms, preferably a single bond or an alkylene group having 1 to 5 carbon atoms, especially preferably a single bond, and
n is a number between 0 and 3, preferably 0 or 1.

It will be understood that, when $R_1$ represents a single bond, $R_1$ thus comprises zero carbon atoms.

It is preferable in particular for the at least one cycloaliphatic dicarboxylic acid to be selected from the group consisting of 1,4-cyclohexanedicarboxylic acid, 1,3-cyclohexanedicarboxylic acid, 1,2-cyclohexanedicarboxylic acid, tetradihydro-2,5-furandicarboxylic acid, tetradihydro-2,5-dimethylfurandicarboxylic acid, decahydro-2,4-naphthalenedicarboxylic acid, decahydro-2,5-naphthalenedicarboxylic acid, decahydro-2,6-naphthalenedicarboxylic acid and decahydro-2,7-naphthalenedicarboxylic acid. It is also possible to use any desired mixtures. Very particular preference is given to 1,4-cyclohexanedicarboxylic acid, 1,3-cyclohexanedicarboxylic acid or 1,2-cyclohexanedicarboxylic acid.

In addition to the cycloaliphatic acid, small amounts of further aliphatic acids may also be used. It is particularly preferable in process step (i) for additionally up to 20 mol %, more preferably up to 10 mol % and very particularly preferably up to 5 mol % of a further aliphatic acid to be present, this acid not being a cycloaliphatic acid. The further aliphatic acid is preferably selected from the group consisting of 2,2,4-trimethyladipic acid, 2,4,4-trimethyladipic acid, 2,2,5-trimethyladipic acid and 3,3-dimethylglutaric acid.

Likewise, according to the invention at least one diaryl carbonate is used in process step (i). It is preferable here for the at least one diaryl carbonate to be selected from the group consisting of a compound of formula (2)

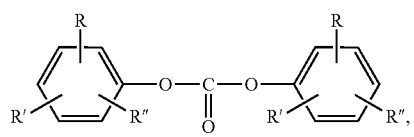

in which
R, R' and R" may each independently be identical or different and represent hydrogen, optionally branched C1-C34 alkyl, C7-C34 alkylaryl, C6-C34 aryl, a nitro group, a carbonyl-containing group, a carboxyl-containing group or a halogen group. Preferably, R, R' and R" are each independently identical or different and represent hydrogen, optionally branched C1-C34 alkyl, C7-C34 alkylaryl, C6-C34 aryl, a nitro group, a carbonyl-containing group or a halogen group. The at least one diaryl carbonate is preferably diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl)phenyl phenyl carbonate, di[4-(1-methyl-1-phenylethyl)phenyl] carbonate, bis(methylsalicyl) carbonate, bis(ethylsalicyl) carbonate, bis(propylsalicyl) carbonate, bis(2-benzoylphenyl) carbonate, bis(phenylsalicyl) carbonate and/or bis(benzylsalicyl) carbonate. The at least one diaryl carbonate is preferably diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl)phenyl phenyl carbonate, di[4-(1-methyl-1-phenylethyl)phenyl] carbonate, bis(2-benzoylphenyl) carbonate, bis(phenylsalicyl) carbonate and/or bis(benzylsalicyl) carbonate. The at least one diaryl carbonate is especially preferably diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl)phenyl phenyl carbonate and/or di[4-(1-methyl-1-phenylethyl)phenyl] carbonate. The at least one diaryl carbonate is particularly preferably diphenyl carbonate.

Furthermore, according to the invention at least one catalyst is present in process step (i). This is preferably an inorganic base and/or an organic catalyst. The at least one catalyst is particularly preferably an inorganic or organic base having a $pK_b$ of not more than 5.

It is also preferable for the at least one inorganic base or the at least one organic catalyst to be selected from the group consisting of the hydroxides, carbonates, halides, phenoxides, diphenoxides, fluorides, acetates, phosphates, hydrogen phosphates and boranates of lithium, sodium, potassium, cesium, calcium, barium, and magnesium, tetramethylammonium hydroxide, tetramethylammonium acetate, tetramethylammonium fluoride, tetramethylammonium tetraphenylboranate, tetraphenylphosphonium fluoride, tetraphenylphosphonium tetraphenylboranate, dimethyldiphenylammonium hydroxide, tetraethylammonium hydroxide, cetyltrimethylammonium tetraphenylboranate, cetyltrimethylammonium phenoxide, diazabicycloundecene (DBU), diazabicyclononene (DBN), 1,5,7-triazabicyclo[4.4.0]dec-5-ene, 7-phenyl-1,5,7-triazabicyclo[4.4.0]dec-5-ene, 7-methyl-1,5,7-triazabicyclo[4.4.0]dec-5-ene, 7,7'-hexylidenedi-1,5,7-triazabicyclo[4.4.0]dec-5-ene, 7,7'-decylidenedi-1,5,7-triazabicyclo[4.4.0]dec-5-ene, 7,7'-dodecylidenedi-1,5,7-triazabicyclo[4.4.0]dec-5-ene, the phosphazene base P1-t-oct (tert-octyliminotris(dimethylamino)phosphorane), the phosphazene base P1-t-butyl (tert-butyliminotris(dimethylamino)phosphorane), and 2-tert-butylimino-2-diethylamino-1,3-dimethylperhydro-1,3,2-diaza-2-phosphorane (BEMP). It is also possible to use any desired mixtures.

The at least one catalyst is particularly preferably an organic base, preferably those mentioned above, very particularly preferably alkylamines, imidazole (derivatives), guanidine bases such as triazabicyclodecene, DMAP and corresponding derivatives, DBN and DBU, most preferably DMAP. These catalysts provide the particular advantage that they can be separated off in process step (ii) according to the invention along with the chemical compound eliminated during the condensation, for example by reduced pressure. This means that the resulting polyestercarbonate contains only a small content of catalyst, or even none at all. This provides the particular advantage that the polymer contains no inorganic salts, as for example are always formed in a route in which phosgene is used. It is known that such salts can have a negative impact on the stability of the polyestercarbonate since the ions can have a catalytic effect with corresponding degradation.

The at least one catalyst is preferably used in amounts of 1 to 5000 ppm, preferably 5 to 1000 ppm and particularly preferably 20 to 200 ppm, based on 1 mol of the cycloaliphatic dicarboxylic acid.

In another embodiment, the process according to the invention is characterized in that the reaction in process step (i) is conducted in the presence of at least a first catalyst and/or a second catalyst and the condensation in process step (ii) is conducted at least in the presence of the first catalyst and the second catalyst, wherein the first catalyst is at least one tertiary nitrogen base, the second catalyst is at least one basic compound, preferably a basic alkali metal salt, and wherein the proportion of the alkali metal cations in process step (ii) is 0.0008% to 0.0050% by weight, based on all components used in process step (i).

In this embodiment, therefore, a first catalyst and/or a second catalyst is present in process step (i).

The first catalyst is a tertiary nitrogen base. This first catalyst is preferably selected from guanidine-derived bases, 4-dimethylaminopyridine (DMAP), 1,8-diazabicyclo[5.4.0]undec-7-ene, 1,5-diazabicyclo[4.3.0]non-5-ene, 1,5,7-triazabicyclo[4.4.0]dec-5-ene, hexamethylphosphorimide triamide, 1,2-dimethyl-1,4,5,6-tetrahydropyridine, 7-methyl-1,5,7-triazabicyclodec-5-ene, 1,8-diazabicyclo[5.4.0]undec-7-ene (DBU), DBN, ethylimidazole, N,N-diisopropylethylamine (Hunig's base), pyridine, TMG, and mixtures of these substances. More preferably, the first catalyst is selected from guanidine-derived bases, 4-dimethylaminopyridine (DMAP), 1,8-diazabicyclo[5.4.0]undec-7-ene, 1,5-diazabicyclo[4.3.0]non-5-ene, and 1,5,7-triazabicyclo[4.4.0]dec-5-ene. Particular preference is given to using 4-dimethylaminopyridine.

The first catalyst is preferably used in an amount of 0.002% to 0.10% by weight, more preferably in an amount of 0.005% to 0.050% by weight, particularly preferably in an amount of 0.008% to 0.030% by weight, based in each case on all components used in process step (i).

It is preferable for the second catalyst to be selected from the group consisting of inorganic or organic alkali metal salts and inorganic or organic alkaline earth metal salts. More preferably, the alkali metal cations present in process step (ii) are lithium cations, potassium cations, sodium cations, cesium cations and mixtures thereof.

The second catalyst used is the organic or inorganic alkali metal or alkaline earth metal salt preferably of a weak acid (pKa of between 3 and 7 at 25° C.). Suitable weak acids are for example carboxylic acids, preferably C2-C22 carboxylic acids, such as acetic acid, propionic acid, oleic acid, stearic acid, lauric acid, benzoic acid, 4-methoxybenzoic acid, 3-methylbenzoic acid, 4-tert-butylbenzoic acid, p-tolueneacetic acid, 4-hydroxybenzoic acid, salicylic acid, partial esters of polycarboxylic acids, such as monoesters of succinic acid, branched aliphatic carboxylic acids, such as 2,2-dimethylpropanoic acid, 2,2-dimethylpropanoic acid, 2,2-dimethylbutanoic acid, and 2-ethylhexanoic acid. However, it is also likewise possible for the organic or inorganic alkali metal or alkaline earth metal salt of a strong acid such as for example hydrochloric acid to be used.

Suitable organic and inorganic salts are or are derived from sodium hydrogen carbonate, potassium hydrogen carbonate, lithium hydrogen carbonate, sodium carbonate, lithium carbonate, potassium carbonate, sodium acetate, potassium acetate, lithium acetate, sodium stearate, potassium stearate, lithium stearate, sodium oleate, lithium oleate, potassium oleate, sodium benzoate, potassium benzoate, lithium benzoate, and the disodium, dipotassium and dilithium salts of BPA. It is also possible to use calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate and corresponding oleates. Corresponding salts of phenols, in particular of phenol, may also be used. These salts may be used individually or in a mixture.

The second catalyst is preferably selected from the group consisting of sodium hydroxide, lithium hydroxide, sodium phenoxide, lithium phenoxide, sodium benzoate, lithium benzoate, lithium chloride, lithium acetylacetonate and cesium carbonate, and mixtures of these substances. Particular preference is given to using sodium phenoxide, lithium phenoxide, sodium hydroxide, lithium hydroxide, sodium benzoate, lithium benzoate, lithium chloride and/or lithium acetylacetonate. Lithium chloride is preferably used as an aqueous solution, for example in the form of a 15% solution.

It was found that the molar ratio of all aliphatic dihydroxy compounds present in process step (i) to all cycloaliphatic dicarboxylic acids present in process step (i) prior to the reaction in process step (i) is preferably 1:0.6 to 1:0.05, more preferably 1:0.5 to 1:0.15, and very particularly preferably 1:0.4 to 1:0.2.

In order to achieve particularly favorable mechanical properties, good chemical resistance and good processing properties, the ratio of aliphatic dihydroxy compounds and cycloaliphatic dicarboxylic acids in the subsequent polyestercarbonate should preferably not be too high (i.e. not too low a content of cycloaliphatic dicarboxylic acids incorporated). Polymers with a high content of units derived from dihydroxy compounds such as isosorbide are usually very rigid and consequently have inadequate mechanical properties. If the content of units derived from cycloaliphatic dicarboxylic acids is too low, the processability of the resulting polymers will also be poorer. In addition, polyester units generally result in better chemical resistance for the polyestercarbonate, which is why the content of units derived from cycloaliphatic dicarboxylic acids should likewise not be too low.

According to the invention, it is particularly preferable for the molar ratio of all aliphatic dihydroxy compounds present in process step (i) to all cycloaliphatic dicarboxylic acids present in process step (i) prior to the reaction in process step (i) to be 1:0.6 to 1:0.05, preferably 1:0.55 to 1:0.1, particularly preferably 1:0.5 to 1:0.15. According to the invention, it has been found that the increase in molecular weight and thus the surface renewal is particularly good in this range in particular.

According to the invention, it is particularly advantageous when, in the process according to the invention,
60 to 90 parts of isosorbide, preferably 65-85 parts of isosorbide, or isosorbide isomer
40 to 10 parts of cycloaliphatic dicarboxylic acid, preferably 35-15 parts of cycloaliphatic dicarboxylic acid, preferably 1,4-cyclohexanedicarboxylic acid
2 to 25 mol %, preferably 3 to 20 mol %, particularly preferably 4 to 18 mol % of isosorbide are replaced by the at least one further aliphatic diol, in particular linear, very preferably branched diol having 2 to 10 carbon atoms. The total amount of the at least one aliphatic diol in the overall composition is here preferably less than 20 mol %, in particular less than 15 mol %.

The process according to the invention is characterized in that carbon dioxide is released during the process. According to the invention, carbon dioxide is preferably eliminated in process step (i) (see reaction scheme above). This procedure allows a quick reaction with low thermal stress.

In addition, process step (i) of the invention preferably comprises at least one, particularly preferably all, of the following steps (ia) to (ic):
(ia) Melting of all components present in process step (i), i.e. at least the at least one cycloaliphatic dicarboxylic acid, the at least one diaryl carbonate, and at least components (A) and (B) in the presence of the at least one catalyst. This is preferably done under a protective gas atmosphere, preferably under nitrogen and/or argon. Step (ia) is preferably effected in the absence of a solvent. The term "solvent" is in this context known to a person skilled in the art. According to the invention, the term "solvent" is preferably understood as meaning a compound that does not enter into a chemical reaction in either of process steps (i) and (ii). Excluded are those compounds that are formed by the reaction (for example phenol if diphenyl carbonate is used as the at least one diaryl carbonate). Of course, the presence of traces of solvents in the starting compounds cannot be ruled out. This case is preferably to be included in accordance with the invention. However, with preference according to the invention, an active step of adding such a solvent is avoided.

(ib) Heating of the mixture, preferably the melt obtained from step (ia). Step (ia) and step (ib) may also overlap, since heating may likewise be necessary to produce a melt in step (ia). The heating is preferably carried out initially to 150° C. to 180° C.

(ic) Reacting the mixture, preferably the mixture obtained from step (ib), with introduction of mixing energy, preferably by stirring. Here, too, step (ic) may overlap with step (ib), since the heating may already initiate the reaction of the mixture. The melt is here preferably already heated under standard pressure to temperatures between 150 and 180° C. as a result of step (ib). Depending on the selected catalyst, the temperature can be left within the range of 160-200° C. Alternatively, the temperature in step (ic) is increased in steps, depending on the observed reactivity, to 200° C.-300° C., preferably 210-260° C., particularly preferably 215-240° C. The reactivity can be estimated from the evolution of gas, in a manner known to a person skilled in the art. Although higher temperatures are in principle also possible in this step, side reactions (e.g. discoloration) can occur at higher temperatures. Higher temperatures are therefore less preferable. The mixture is stirred under standard pressure until the evolution of gas has largely ceased. It is in accordance with the invention possible that under these conditions the aryl alcohol formed by the reaction of the at least one carboxylic acid with the at least one diaryl carbonate (for example phenol when using diphenyl carbonate) will already also be partly removed.

According to the invention, it was also observed that at least one of the dihydroxy compounds (A) and/or (B) had likewise already begun to react by this time. For instance, it was possible to detect oligomers comprising carbonate units from the reaction of the at least one of the dihydroxy compounds (A) and/or (B) with the at least one diaryl carbonate and/or ester units from the reaction of the at least one of the dihydroxy compounds (A) and/or (B) with the at least one dicarboxylic acid.

It is therefore preferable according to the invention for the mixture obtained from process step (i), prior to the performance of process step (ii), to include oligomers comprising carbonate units from the reaction of at least one of the dihydroxy compounds (component (A) and/or (B)) with the at least one diaryl carbonate and/or ester units from the reaction of at least one of the dihydroxy compounds (component (A) and/or (B)).

The reaction time in step (ic) depends on the amount of the starting materials. Preferably, the reaction time in step (ic) is between 0.5 h to 24 h, preferably between 0.75 h and 5 h, and particularly preferably between 1 h and 3 h. It is preferable here to select the reaction time such that the evolution of gas has largely subsided (see reaction scheme above).

According to the invention, it is preferable for the molar ratio of the sum of all dihydroxy compounds present in process step (i) and all cycloaliphatic dicarboxylic acids present in process step (i) to all diaryl carbonates present in process step (i) prior to the reaction in process step (i) to be 1:0.4 to 1:1.6, preferably 1:0.5 to 1:1.5, further preferably 1:0.6 to 1:1.4, particularly preferably 1:0.7 to 1:1.3, especially preferably 1:0.8 to 1:1.2, and very particularly preferably 1:0.9 to 1:1.1. A person skilled in the art is capable of selecting corresponding optimally suitable ratios according to the purity of the starting substances.

Process Step (ii)

In process step (ii), the mixture obtained from process step (i) undergoes further condensation, at least with removal of the chemical compound eliminated in the condensation. In accordance with the invention, the expression "further" condensation is to be understood as meaning that at least some condensation has already taken place in process step (i). This is preferably the reaction of the at least one cycloaliphatic dicarboxylic acid with the at least one diaryl carbonate with the elimination of an aryl alcohol. Preferably, however, further condensation to form oligomers has also already taken place (see in this respect process step (i)).

If, in process step (i), only the first catalyst or only the second catalyst has been used, then the catalyst not used in process step (i) is added in process step (ii).

The proportion of alkali metal cations in process step (ii) is preferably 0.0009% to 0.0005% by weight and particularly preferably 0.0010% to 0.0045% by weight, based in each case on all components used in process step (i).

In a preferred embodiment, the first catalyst and the second catalyst are present in process step (i).

It is also possible to use a portion of the first catalyst and/or a portion of the second catalyst in process step (i) and to then use the respective remainder in process step (ii).

However, preference is given to using the entire amount of the first and/or of the second catalyst in process step (i). Most preferably, the entire amount of both catalysts is used in process step (i).

The term "condensation" is known to a person skilled in the art. This is preferably understood as meaning a reaction in which two molecules (of the same substance or different substances) combine to form a larger molecule, with a molecule of a chemically simple substance being eliminated. This compound eliminated in the condensation is removed in process step (ii). It is preferable here for the chemical compound eliminated in the condensation to be removed in process step (ii) by means of reduced pressure. It is accordingly preferable for the process according to the invention to be characterized in that the volatile constituents having a boiling point below the cycloaliphatic diester formed in process step (i), below the mixture of dihydroxy compounds, and below the at least one diaryl carbonate, are removed during the reaction in process step (i), optionally accompanied by a stepwise reduction in pressure. A stepwise removal is preferably chosen when different volatile constituents are being removed. Stepwise removal is also preferably chosen in order to ensure that the volatile constituent(s) is/are removed as completely as possible. The volatile constituents are the chemical compound(s) eliminated in the condensation.

Reducing the pressure in steps can be done for example by lowering the pressure as soon as the overhead temperature falls, so as to ensure continuous removal of the chemical compound eliminated in the condensation. Once a pressure of 1 mbar, preferably <1 mbar, has been reached, the condensation is continued until the desired viscosity has been attained. This can be done for example by monitoring the torque, i.e. the polycondensation is stopped on attaining the desired stirrer torque.

The condensation product is preferably removed in process step (ii) at temperatures of 200° C. to 280° C., particularly preferably 210° C. to 260° C., and especially preferably 220° C. to 250° C. The vacuum during the removal is further preferably 500 mbar to 0.01 mbar. It is particularly preferable for removal to be effected in steps by reducing the vacuum. The vacuum in the final stage is very particularly preferably 10 mbar to 0.01 mbar.

The polyestercarbonate according to the invention can be processed as such into molded articles of all kinds. It may also be processed with other thermoplastics and/or polymer additives to give thermoplastic molding compounds. The molding compounds and molded articles are further subject matter of the present invention.

The polymer additives are preferably selected from the group consisting of flame retardants, anti-drip agents, flame retardant synergists, smoke inhibitors, lubricants and demolding agents, nucleating agents, antistats, conductivity additives, stabilizers (e.g. hydrolysis, heat aging and UV stabilizers and also transesterification inhibitors), flow promoters, phase compatibilizers, dyes and pigments, impact modifiers and also fillers and reinforcers.

The thermoplastic molding compounds may for example be prepared in a known manner by mixing the polyestercarbonate and the further constituents and melt-compounding and melt-extruding them at temperatures of preferably 200° C. to 320° C. in conventional units such as internal kneaders, extruders and twin-shaft screw systems. In the context of the present application this process is generally referred to as compounding.

The term "molding compound" is thus to be understood as meaning the product obtained when the constituents of the composition are melt-compounded and melt-extruded.

The molded articles formed from the polyestercarbonate according to the invention or from the thermoplastic molding compounds comprising the polyestercarbonate may be produced for example by injection molding, extrusion and blow-molding processes. A further form of processing is the production of molded articles by thermoforming from previously produced sheets or films.

EXAMPLES

Materials Used:

Cyclohexanedicarboxylic acid: 1,4-Cyclohexanedicarboxylic acid; CAS 1076-97-7 99%; Tokyo Chemical Industries, Japan, abbreviated as CHDA. The CHDA contained less than 1 ppm sodium per elemental analysis Diphenyl carbonate: Diphenyl carbonate, 99.5%, CAS 102-09-0; Acros Organics, Geel, Belgium, abbreviated as DPC 4-Dimethylaminopyridine: 4-dimethylaminopyridine; >98.0%; purum; CAS 1122-58-3; Sigma-Aldrich, Munich, Germany, abbreviated as DMAP Isosorbide: isosorbide (CAS: 652-67-5), 99.8%, Polysorb PS A; Roquette Freres (62136 Lestrem, France); abbreviated as ISB Lithium hydroxide monohydrate (CAS: 1310-66-3); >99.0%; Sigma-Aldrich 2-Butyl-2-ethyl-1,3-propanediol: CAS No.: 115-84-4; Aldrich (abbreviated as BEPD)

2,2,4,4-Tetramethyl-1,3-cyclobutanediol: 98% (CAS: 3010-96-6); ABCR (abbreviated as TMCBD)

2,2,4-Trimethyl-1,3-pentanediol; CAS No.: 144-19-4; Aldrich (abbreviated as TMPD)

Neopentyl glycol (2,2-dimethylpropane-1,3-diol); CAS: 126-30-7; Aldrich (abbreviated as NPG)

1,4-Butanediol: CAS: 110-63-4; Merck 99%; (abbreviated as BDO)

1,4-Cyclohexanedimethanol: CAS: 105-08-8, Aldrich 99% (abbreviated as CHDM)

1,12-Dodecanediol: CAS: 5675-51-4, Aldrich 99% (abbreviated as DDD)

Analytical Methods:

Solution Viscosity

The relative solution viscosity ($\eta$rel; also referred to as eta rel) was determined in dichloromethane at a concentration of 5 g/l at 25° C. with an Ubbelohde viscometer. The determination was carried out in accordance with DIN 51562-3; 1985-05. This method involves measuring the flow times of the polyestercarbonate to be measured through the Ubbelohde viscometer in order to then ascertain the difference in viscosity between the polymer solution and its solvent. For this purpose, the Ubbelohde viscometer is first calibrated by measuring the pure solvents dichloromethane, trichloroethylene and tetrachloroethylene (always performing at least 3 measurements, but at most 9 measurements). This is followed by the calibration proper using the solvent dichloromethane. The polymer sample is then weighed out, dissolved in dichloromethane and then the flow time is determined three times for this solution. The mean value for the flow times is corrected via the Hagenbach correction and the relative solution viscosity is calculated. Determination of the glass transition temperature The glass transition temperature was determined by differential scanning calorimetry (DSC) in accordance with standard DIN EN ISO 11357-1:2009-10 and ISO 11357-2:2013-05 at a heating rate of 10 K/min under nitrogen with determination of the glass transition temperature (Tg) measured as the point of inflection in the second heating run.

Tensile tests

The product was dissolved in dichloromethane and neutralized with approx. 50 mg of phosphonic acid (in aq.). After homogenization, the dichloromethane was evaporated off under ambient air and the remainder was removed at approximately 60° C. in a vacuum drying cabinet under the best possible vacuum. A hand lever machine and a Retsch mill with a sieve size of 1.5 mm were used for the following mechanical comminution. The pre-drying at 70° C. and <50 mbar in the vacuum drying cabinet was carried out for approx. 16 h. The temperature was then raised to 110° C. and drying continued for 5 h.

For the tensile tests, the films produced in the melt press were cut into 5-mm-wide strips having a length of at least 50 mm. The tensile testing was conducted in accordance with the ASTM D 638 standard. The strips were drawn at a room temperature of approx. 25° C. and a relative humidity of approx. 20%. The tensile modulus was ascertained with a pretension of 0.01 MPa with a test speed of 100 mm/min. The test speed for the continuous measurement was 50 mm/min. The switch-over of the elongation rate from 100 mm/min to 50 mm/min was position-controlled via the crosshead displacement. The clamping length was 20 mm. No clamp failure was observed. The results of the tensile tests as summarized as average values from in each case five individual measurements.

The flow behavior is ascertained by determining the melt viscosity using a plate-plate viscometer in accordance with ISO 6721-10 from 1999. The value of the viscosity at 1 hertz and at 10 hertz is used in this case:

The melt viscosities were determined using an Ares G-2 rotational rheometer from TA Instruments (New Castle, DE 19720, USA). A plate-plate geometry was used (25 mm diameter). The plate diameter amounts to 25 mm (PP25). The samples, where evaporation residues were involved, were first dried in a vacuum drying cabinet at approx. 80° C.

and then pressed into thin films using a hot press at 240° C. The samples were measured at various temperatures above the glass transition temperature. The deformation during the measurement was chosen so that measurement was conducted within the linear-elastic range. The measurement results at the various temperatures were subsequently shifted to a master curve at the reference temperature 200° C. using time-temperature superposition.

Comparative Example 1 (Experiment without Additional Diol)

A flask with a short-path separator was initially charged with 17.20 g (0.10 mol) of 1,4-cyclohexanedicarboxylic acid and 29.83 g (0.204 mol) of isosorbide, and also 64.30 g (0.3 mol) of diphenyl carbonate, 0.0111 g of DMAP (4-dimethylaminopyridine; 100 ppm based on the starting materials CHDA, DPC and ISB) and 115 µl of an aqueous solution of lithium hydroxide (100 g/l), corresponding to approx. 30 ppm Li. The mixture was freed of oxygen by evacuating and venting with nitrogen four times. The mixture was melted and heated to 160° C. at standard pressure with stirring. The mixture was stirred for 40 minutes at 160°, for 60 minutes at 175° C., for 30 minutes at 190° C. for 10 minutes at 205° C. During this operation, carbon dioxide was continuously evolved. On cessation of $CO_2$ evolution, the bath temperature was adjusted to 220° C. After a further 20 minutes, a vacuum was applied. The pressure was lowered to 10 mbar within 30 minutes. Phenol was continuously removed in the process. The mixture was stirred at 10 mbar for about 10 minutes. The pressure was then lowered to <1 mbar (approx. 0.7 mbar) and the condensation was continued for a further 10 minutes. Processing of the mixture was then stopped.

A light yellow polymer having a solution viscosity of eta rel 1.33 was obtained.

The other examples (Ex.) and comparative examples (Comp.) were carried out as stated for comparative example 1. In a departure from example 1, the aliphatic diols respectively specified in table 1 were in addition initially charged in the flask with a short-path separator, together with all the other polymer-forming monomers and the catalyst.

TABLE 1

|  | Comp. 1 | Inv. 1 | Inv. 2 | Inv. 3 | Inv. 4 | Inv. 5 | Inv. 6 | Inv. 7 | Inv. 8 |
| --- | --- | --- | --- | --- | --- | --- | --- | --- | --- |
| CHDA/ISB/ HO—R—OH molar ratio | 33/67/0 | 33/64/3 | 33/60/7 | 33/57/10 | 33/64/3 | 33/57/10 | 33/60/7 | 33/64/3 | 33/64/3 |
| mol % HO—R—OH | 0 | 5 | 10 | 15 | 5 | 15 | 10 | 5 | 5 |
| CHDA (mol) approx. | 0.1 | 0.2 | 0.2 | 0.2 | 0.2 | 0.2 | 0.1 | 0.1 | 0.1 |
| HO—R—OH approx. (mol) | 0 | 0.02 TMPD | 0.04 TMPD | 0.06 TMPD | 0.02 NPG | 0.06 NPG | 0.02 BEPD | 0.01 BEPD | 0.01 TMCBD |
| DPC (mol) approx. | 0.3 | 0.6 | 0.6 | 0.6 | 0.6 | 0.6 | 0.3 | 0.3 | 0.3 |
| ISB (mol) approx. | 0.2 | 0.38 | 0.36 | 0.34 | 0.38 | 0.34 | 0.18 | 0.19 | 0.19 |
| Eta rel | 1.33 | 1.383 | 1.362 | 1.647 | 1.413 | 1.446 | 1.501 | 1.474 | 1.434 |
| Glass transition temperature in ° C. | 151 | 144 | 146 | 138 | 150 | 147 | 133 | 142 | 154 |
| Tensile modulus (modulus of elasticity) $N/mm^2$ | 1740 ± 128 |  | 283 ± 64 | 1130 ± 183 |  | 1020 ± 55.8 | 1210 ± 110 | 917 ± 145 | 79.6 ± 29.3 |
| Elongation at break (DR) % | 8.8 ± 0.9 |  | 8.3 ± 2.8 | 7.6 ± 1.5 |  | 16.7 ± 13.5 | 10.0 ± 1.5 | 8.5 ± 2.4 | 6.2 ± 1.2 |
| Shear viscosity at 1 Hz |  |  |  |  |  |  |  | 27840 Pa s | 35920 Pa s |
| Shear viscosity at 10 Hz |  |  |  |  |  |  |  | 8160 Pa s | 7760 Pa s |

|  | Inv. 9 | Comp. 2 | Comp. 3 | Comp. 4 | Comp. 5 | Comp. 6 | Comp. 7 |
| --- | --- | --- | --- | --- | --- | --- | --- |
| CHDA/ISB/ HO—R—OH molar ratio | 33/57/10 | 33/64/3 | 33/64/3 | 33/57/10 | 33/335/33.5 | 33/33.5/33.5 | 33/33.5/33.5 |
| mol % HO—R—OH | 15 | 5 | 5 | 15 | 50 | 50 | 50 |
| CHDA (mol) approx. | 0.1 | 0.1 | 0.1 | 0.1 | 0.1 | 0.1 | 0.1 |

TABLE 1-continued

| | | | | | | | |
|---|---|---|---|---|---|---|---|
| HO—R—OH approx. (mol) | 0.03 TMCBD | 0.01 BDO | 0.01 CHDM | 0.03 DDD | 0.1 TMPD | 0.1 NPG | 0.1 DDD |
| DPC (mol) approx. | 0.3 | 0.3 | 0.3 | 0.3 | 0.3 | 0.3 | 0.3 |
| ISB (mol) approx. | 0.17 | 0.19 | 0.19 | 0.17 | 0.1 | 0.1 | 0.1 |
| Eta rel | 1.606 | 1.396 | 1.41 | 1.31 | 1.094 | 1.119 | 1.149 |
| Glass transition temperature in ° C. | 153 | 145 | 145 | 94 | 94 | 84 | gel-like at room temperature |
| Tensile modulus (modulus of elasticity) N/mm² | 135 ± 75.4 | 83.5 ± 7 | 258 ± 128 | 998 ± 88 | Not measurable | Not measurable | Not measurable |
| Elongation at break (DR) % | 5.7 ± 1.7 | 10.2 ± 3.6 | 7.0 ± 0.8 | 7.7 ± 0.6 | Not measurable | Not measurable | Not measurable |
| Shear viscosity at 1 Hz | | | 60960 Pa s | | | | |
| Shear viscosity at 10 Hz | | | 15470 Pa s | | | | |

The mol data in the first column of table 1 are reported as "approx." since they were rounded to the second decimal place. The ratio 2.04:1.00 (diols to diacids) was used as a basis.

Examples 1 to 9 according to the invention show that the process of the invention affords the desired polyestercarbonates in high viscosities provided that the amounts of additional diol according to the invention are observed. It can be seen here that the addition of a further aliphatic, branched diol causes the molecular weight to rise significantly compared to an example in which no further aliphatic diol is present (see comparative example 1). Better miscibility was observed at higher temperatures, which meant it was possible for a further increase in molecular weight to take place. When an excessive amount of additional diol is used (see comparative examples 5 to 7), the increase in molecular weight is markedly lower. In addition, it can be seen that the presence of a structural unit (B) in the polyestercarbonate initially lowers the mechanical properties such as the modulus of elasticity and the elongation at break, but a higher molecular weight can be achieved overall. The higher the proportion of structural units (B), the better the mechanical properties such as the modulus of elasticity and elongation at break. However, an excessive proportion of structural unit (B) in turn leads to a low molecular weight and hence again to a deterioration in the mechanical properties. A good balance between mechanical properties and molecular weight is therefore achieved in the amount range of structural unit (B) according to the invention. In addition, high molecular weights lead to lower end group contents. This is advantageous in principle since a reduction in the molecular weight usually starts from the chain end.

It should be noted that the error values for the modulus of elasticity and the elongation at break are relatively high. This results from the fact that relatively small sample amounts were used and in some cases there was the formation of bubbles. However, a person skilled in the art understands that the resulting values are significant despite these errors.

It can likewise be seen that the use of additional diols comprising branches (both branched alkylene groups and branched cycloalkylene groups) results in a lower shear viscosity despite a higher solution viscosity and with comparable Tg values.

The invention claimed is:

1. A process for preparing a polyestercarbonate by means of melt transesterification, comprising the steps of
   (i) reaction of at least one dicarboxylic acid of chemical formula (IIa) or (IIb)

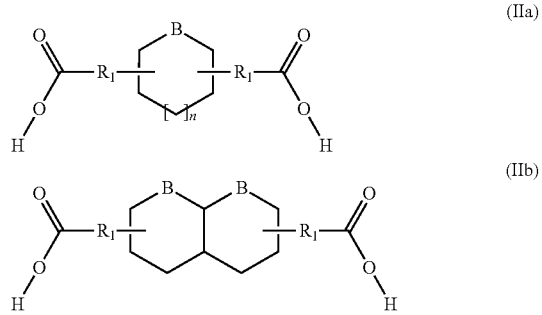

in which
B each independently represents a CH$_2$ group or a heteroatom selected from the group consisting of O and S,
R$_1$ each independently represents a single bond or an alkylene group having 1 to 10 carbon atoms, and
n is a number between 0 and 3,
with at least one diaryl carbonate using at least one catalyst and in the presence of a mixture of dihydroxy compounds, comprising (A) at least one 1,4:3,6-dianhydrohexitol and (B) at least one further aliphatic dihydroxy compound of chemical formula (I)

in which X represents a branched alkylene group having 4 to 20 carbon atoms, which may optionally be interrupted by at least one heteroatom, or a cycloalkylene group comprising at least one branch, wherein the cycloalkylene group has 4 to 20 carbon atoms, which may optionally be interrupted by at least one heteroatom, and (ii) further condensation of the mixture obtained from process step (i), at least with removal of the chemical compound eliminated in the condensation, wherein the mixture of dihydroxy compounds comprises 98 mol % to 75 mol % of component (A) and 2 mol % to 25 mol % of component (B), based in each case on the sum of components (A) and (B).

2. The process as claimed in claim 1, wherein the polyestercarbonate comprises the structural formula (1)

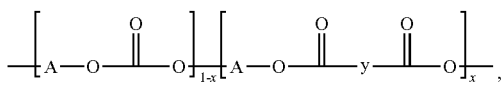

in which

A independently per repeating unit represents at least either structural unit (A) or structural unit (B), where (A) represents chemical formula (2)

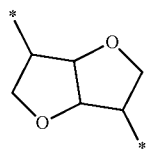

and (B) represents chemical formula (3)

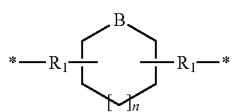

where x represents a branched alkylene group having 4 to 20 carbon atoms, which may optionally be interrupted by at least one heteroatom, or a cycloalkylene group comprising at least one branch, wherein the cycloalkylene group has 4 to 20 carbon atoms, which may optionally be interrupted by at least one heteroatom, y each independently represents chemical formula (IIIa) or (IIIb)

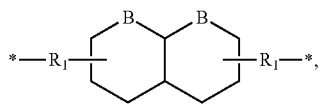

in which B each independently represents a $CH_2$ group or a heteroatom selected from the group consisting of O and S, $R_1$ each independently represents a single bond or an alkylene group having 1 to 10 carbon atoms, n is a number between 0 and 3, and $0<x<1$, where the * in each case indicate the position at which the chemical formulae are incorporated into the polyestercarbonate, wherein the polyestercarbonate comprises 98 mol % to 75 mol % of structural unit (A) and 2 mol % to 25 mol % of structural unit (B), based in each case on the sum of the structural units (A) and (B), and wherein the polyestercarbonate has a relative solution viscosity, measured in dichloromethane at a concentration of 5 g/l at 25° C. with an Ubbelohde viscometer, of 1.20 to 1.70.

3. The process as claimed in claim 1, wherein the molar ratio of all aliphatic dihydroxy compounds present in process step (i) to all cycloaliphatic dicarboxylic acids present in process step (i) prior to the reaction in process step (i) is 1:0.6 to 1:0.05.

4. The process as claimed in claim 1, wherein the at least one further aliphatic dihydroxy compound of chemical formula (I) is selected from the group consisting of 2,2-bis(4-hydroxycyclohexyl)propane, 2-butyl-2-ethyl-1,3-propanediol, 2,2,4,4-tetramethyl-1,3-cyclobutanediol, 2,2,4-trimethyl-1,3-pentanediol, 2,2-dimethylpropane-1,3-diol, 8-(hydroxymethyl)-3-tricyclo[5.2.1.02,6]decanyl]methanol and any desired mixtures thereof.

5. The process as claimed in claim 1, wherein the at least one cycloaliphatic dicarboxylic acid is selected from the group consisting of 1,4-cyclohexanedicarboxylic acid, 1,3-cyclohexanedicarboxylic acid, 1,2-cyclohexanedicarboxylic acid, tetradihydro-2,5-furandicarboxylic acid, tetradihydro-2,5-dimethylfurandicarboxylic acid, decahydro-2,4-naphthalenedicarboxylic acid, decahydro-2,5-naphthalenedicarboxylic acid, decahydro-2,6-naphthalenedicarboxylic acid and decahydro-2,7-naphthalenedicarboxylic acid.

6. The process as claimed in claim 1, wherein the at least one diaryl carbonate is selected from the group consisting of a compound of formula (2)

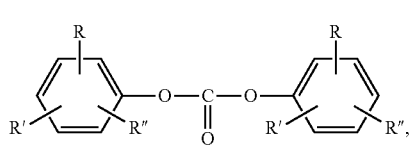

in which

R, R' and R" may each independently be identical or different and represent hydrogen, optionally branched C1-C34 alkyl, C7-C34 alkylaryl, C6-C34 aryl, a nitro group, a carbonyl-containing group, a carboxyl-containing group or a halogen group.

7. The process as claimed in claim 1, wherein the cycloalkylene group contains a plurality of rings.

8. The process as claimed in claim 1, wherein:

B each independently represents a $CH_2$ group or an oxygen atom, $R_1$ each independently represents a single bond, and n is 0 or 1.

* * * * *